United States Patent
Benson et al.

(10) Patent No.: US 11,423,558 B2
(45) Date of Patent: Aug. 23, 2022

(54) SYSTEM FOR ASSEMBLING COMPOSITE GROUP IMAGE FROM INDIVIDUAL SUBJECT IMAGES

(71) Applicant: Shutterfly, LLC, Redwood City, CA (US)

(72) Inventors: Keith A. Benson, Eden Prairie, MN (US); Brent Peterson, Chanhassen, MN (US)

(73) Assignee: Shutterfly, LLC, Redwood City, CA (US)

( * ) Notice: Subject to any disclaimer, the term of this patent is extended or adjusted under 35 U.S.C. 154(b) by 0 days.

(21) Appl. No.: 17/329,278

(22) Filed: May 25, 2021

(65) Prior Publication Data
US 2021/0350558 A1 Nov. 11, 2021

Related U.S. Application Data

(63) Continuation of application No. 16/731,190, filed on Dec. 31, 2019, now Pat. No. 11,049,272.

(51) Int. Cl.
| | |
|---|---|
| *G06T 7/521* | (2017.01) |
| *G01B 11/25* | (2006.01) |
| *G03B 15/02* | (2021.01) |
| *H04N 13/254* | (2018.01) |
| *H04N 5/225* | (2006.01) |

(52) U.S. Cl.
CPC ............ *G06T 7/521* (2017.01); *G01B 11/25* (2013.01); *G03B 15/02* (2013.01); *H04N 5/2256* (2013.01); *H04N 13/254* (2018.05)

(58) Field of Classification Search
None
See application file for complete search history.

(56) References Cited

U.S. PATENT DOCUMENTS

| | | | |
|---|---|---|---|
| 7,834,894 B2 | 11/2010 | Swanson et al. | |
| 9,025,906 B2 | 5/2015 | Breckenridge et al. | |
| 9,264,627 B2 | 2/2016 | Holmes et al. | |
| 10,110,792 B2 | 10/2018 | Benson | |
| 10,198,080 B1 | 2/2019 | Worley | |
| 10,814,427 B2 | 10/2020 | Ostroverkhov et al. | |
| 11,030,730 B2 | 6/2021 | Benson | |
| 2012/0218441 A1 | 8/2012 | Counts et al. | |
| 2014/0169697 A1 | 6/2014 | Breckenridge et al. | |
| 2018/0149519 A1* | 5/2018 | Connor | G01J 3/0291 |
| 2018/0281067 A1 | 10/2018 | Small et al. | |

* cited by examiner

*Primary Examiner* — Edemio Navas, Jr.
(74) *Attorney, Agent, or Firm* — Merchant & Gould P.C.

(57) ABSTRACT

A system for assembling a group composite image from individual subject images is described. Often subjects of a group vary in height. Additionally, as each subject is photographed individually, different zoom factors can be applied by a camera that affects a pixel density of the image captured. The system includes a fiducial marking device that emits collimated light to form one or more fiducial markers on a subject while an image is captured by the camera. Based on a location of the fiducial markers in the image, a pixel density of the image and a reference height of the subject can be determined. The individual subject image can be scaled based on the pixel density and reference height to account for the varying subject heights and zoom factors to generate a group composite image that accurately represents the subjects of the group relative to one another.

8 Claims, 15 Drawing Sheets

SYSTEM FOR ASSEMBLING COMPOSITE GROUP IMAGE FROM INDIVIDUAL SUBJECT IMAGES

CROSS-REFERENCE TO RELATED APPLICATION(S)

This application is a Continuation of U.S. application Ser. No. 16/731,190, filed on Dec. 31, 2019, the disclosure of which is hereby incorporated by reference in its entirety. To the extent appropriate a claim of priority is made to the above-disclosed application.

BACKGROUND

A composite group image can be assembled from separate images captured of individual subjects within the group. Example groups can include school groups, sports teams, business or project teams, church groups, and organizational groups, among other similar groups. In some instances, capturing separate images is preferable over physically gathering each of the individual subjects in the group to capture an image of the entire group. For example, it can be difficult to gather each of the individual subjects at a same time and place. Additionally, it can be difficult to have each of the individual subjects looking their best when capturing the image of the entire group.

Individual subjects of a group often vary in height. Thus, when assembling the composite group image from the individual subject images, it is important to take into consideration a height of each subject to ensure the subjects are represented accurately when resizing the individual subject images for assembly. For example, if height was not considered, then an image of a tall adult and an image of a short child would be resized such that the adult and child are a same size in the assembled composite group image causing the adult to appear shorter and/or the child to appear taller than he or she actually is.

Current techniques for obtaining the height of the subject are limited to self-reporting by the subject and/or estimation by a photographer, which can be inaccurate. Also, these self-reported or estimated heights require manual entry into an image processing system by the photographer, for example, leaving further room for error. In addition to heights, zoom factors associated with the individual subject images can also vary, leading to further difficulties in accurate scaling or resizing of the individual subject image for including in the composite group image.

SUMMARY

In general terms, this disclosure is directed to a system for assembling a composite group image from a plurality of individual subject images. In one possible configuration and by non-limiting example, the system includes a fiducial marking device that causes at least one fiducial marker to be formed on a subject and captured in a fiducially marked image of the subject. Based on a location of the fiducial marker, a pixel density of the image and a reference height of the subject can be determined. A subject-illuminated image of the subject is then processed based on the determined pixel density and reference height prior to inclusion and arrangement within the composite group image to account for a variable zoom factor associated with the image and the height of the subject, respectively. Various aspects are described in this disclosure, which include, but are not limited to, the following aspects.

One aspect is a photography method. The photography method includes illuminating a subject with a collimated light, capturing a fiducially marked image of the subject with a digital camera, the fiducially marked image including a fiducial marker formed on the subject by the collimated light, and determining at least a pixel density of the fiducially marked image and a reference height of the subject based on a location of the fiducial marker. The photography method further includes capturing at least one other image of the subject with the digital camera, and generating a photography product using the at least one other image, the pixel density of the fiducially marked image, and the reference height of the subject.

Another aspect is a photographic system. The photographic system can include a fiducial marking device and a camera. The fiducial marking device can include a fiducial light source configured to emit collimated light. The camera can be configured to capture a fiducially marked image of a subject, the fiducially marked image including a fiducial marker formed on the subject from the collimated light. The camera can also be configured to capture at least one other image of the subject with the digital camera, where a photography product can be generated using the at least one other image and values determined from a location of the fiducial marker, the values including a pixel density of the fiducially marked image and a reference height of the subject.

A further aspect is a method of generating a composite group image. The method can include, for a subject of a plurality of subjects to be arranged in a composite group image: illuminating the subject with collimated light; capturing a fiducially marked image of the subject with a digital camera, the fiducially marked image including a fiducial marker formed on the subject by the collimated light; determining a pixel density of the fiducially marked image and a reference height of the subject based on a location of the fiducial marker; capturing a subject-illuminated image of the subject with the digital camera; and based on the determined pixel density of the fiducially marked image and the reference height of the subject, processing the subject-illuminated image of the subject. The method can further include arranging the processed image of the subject among processed images of other subjects of the plurality of subjects to generate the composite group image.

DETAILED DESCRIPTION

Figure 1:
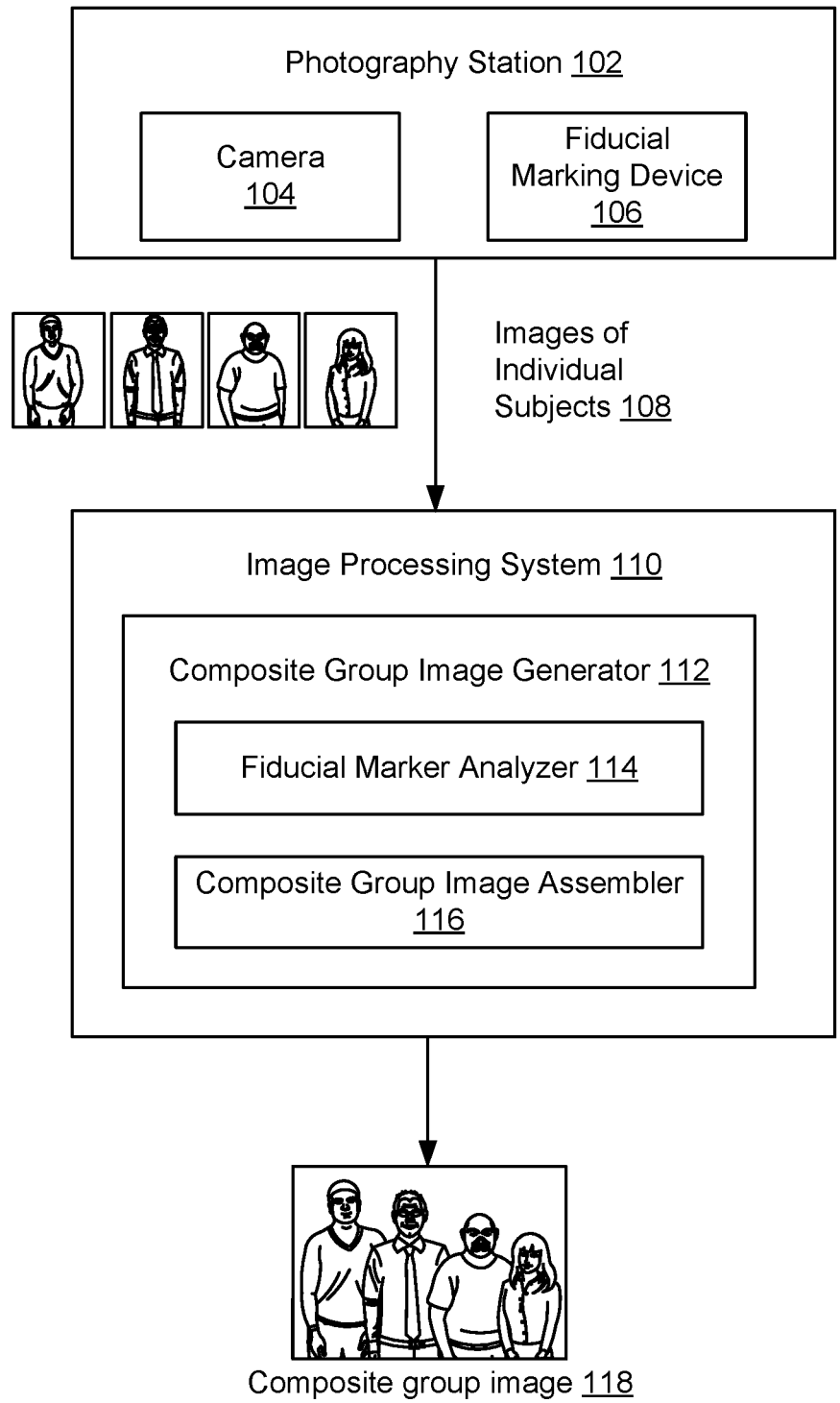
FIG. 1 is a block diagram of an example system for assembling a composite group image from images of individual subjects.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a block diagram of an example system 100 for assembling a composite group image 118 from images of individual subjects 108. The system 100 can include a photography station 102 and an image processing system 110. In some examples, the photography station 102 includes a camera 104 and a fiducial marking device 106, and the image processing system 110 includes a composite group image generator 112. The composite group image generator 112 can include a fiducial marker analyzer 114 and a composite group image assembler 116.

In some examples, the photography station 102 is a structure used by a photographer for photographing a subject to capture a digital image of the subject with the camera 104. Example subjects can include humans, animals, plants, and products or other objects. In some examples, the photography station 102 is a professional photography studio where photographers take photographs of subjects. In other examples, the photography station 102 is a mobile photography studio, which is portable so that it can be setup at a remote location, such as in a school, church, or other building or location. In further examples, the photography station 102 can be an outdoor photography station.

In addition to the camera 104 and the fiducial marking device 106, the photography station 102 can include one or more backgrounds, one or more lights, and one or more other devices to facilitate and control the capturing of the digital image of the subject. An example photography station 102 is shown and described in more detail below with reference to FIG. 2.

The camera 104 is a device that operates to capture a set of images of a subject. For example, the set of images can include two or three images captured by the camera 104 within an image capture sequence, as described in more detail below with reference to FIG. 11. In some examples, the camera 104 is a mirrorless digital camera. In other examples, the camera 104 is another type of digital camera capable of capturing at least three images in less than 100 milliseconds. An example of the camera 104 is shown and described in more detail below with reference to FIG. 5.

The fiducial marking device 106 is a device that operates to emit collimated light to form one or more fiducial markers on the subject while an image is captured by the camera 104. The image, hereinafter referred to as a fiducially marked image, can include the fiducial markers. The fiducially marked image can be one image of the image capture sequence. The fiducial marking device 106 includes one or more fiducial light sources that emit the collimated light. The fiducial light sources can be elevated and supported by a stand. In some examples, the fiducial marking device 106 further includes a beam splitter or a diffractive optical element. An example of the fiducial marking device 106 is shown and described in more detail below with reference to FIG. 6.

Once captured, the images of the individual subjects 108 (e.g., the set of images for each subject) can be transferred to the image processing system 110. In some examples, the images of the individual subjects 108 are stored as image data in a computer readable medium and the computer readable medium is brought or is transported through a mail delivery system to the image processing system 110. Examples of computer readable media include memory cards (discussed above), a compact disc (CD), a digital versatile disc (DVD), a hard disc of a hard disc drive, or other types of computer readable media. In other examples, the images of the individual subjects 108 are transferred across a network, such as the Internet (e.g., network), a local area network, or a cable connection, to the image processing system 110.

The composite group image generator 112 of the image processing system 110 then generates the composite group image 118 from the images of the individual subjects 108 transferred to the image processing system 110. The fiducial marker analyzer 114 can determine values for resizing and/or scaling the images of the individual subjects 108 to account for potentially varying zoom factors applied by the camera 104 when the images of the individual subjects 108 were captured and heights of the individual subjects in the group. The composite group image assembler 116 can then process the images of the individual subjects 108 based on the values determined by the fiducial marker analyzer 114 to generate a photography product for each of the individual subjects 108. In some examples, the photography products (e.g., the processed images of the subjects) may then be arranged within the composite group image 118. In other examples, the photography products may be used individually for other purposes.

To provide an example scenario, colleagues belonging to a project team are the individual subjects that are being photographed for their company's website. The subjects are individually photographed using the camera 104 to capture the images of the individual subjects 108. Each of the subjects of the group vary in height, and as each subject is photographed, different zoom factors are applied by the camera 104. Additionally, one or more of the subjects may not be positioned correctly and/or move as the images are being captured.

For each subject, a set of images is captured and transferred to the image processing system 110. At least one of the images captured includes the fiducially marked image of the subject. The fiducially marked image includes one or more fiducial markers formed on the subject as a result of collimated light emitted by one or more fiducial light sources of the fiducial marking device 106. Another one of the images captured in the image capture sequence can include a subject-illuminated image that is captured independently from the fiducially marked image. A further one of the images captured in the image capture sequence can include a background-illuminated image. The background-illuminated image can be captured independently from the fiducially marked image and/or captured simultaneously with the fiducially marked image in a single frame, for example.

To account for the varying heights of the subjects and the different zoom factors applied by the camera 104 when each subject was photographed, as well as a potential variable position or motion of the subjects while photographed, the fiducial marker analyzer 114 can determine a pixel density of images captured for each subject and a reference height of each subject based on a location of the fiducial markers in the respective fiducially marked image captured for each subject. The pixel density is a number of pixels in an image per inch. During the capture of the set of images for a subject, the camera 104 often remains stationary and the images within the same set can have the same the pixel density. However, the pixel density of an image can change as the camera 104 is moved and zoomed uniquely for the capture of each individual subject. Thus, determining the pixel density can account for the differing zoom factors applied by the camera 104 as each subject was captured. The reference height of the individual subject is a vertical pixel location in the image that represents a relative height of the individual to account for the varying heights of the subjects. Methods for determining the location of the fiducial markers and subsequently determining the pixel density and reference height are described in greater detail below with reference to FIGS. 11 and 12.

The composite group image assembler 116 can then generate a photography product using at least the subject-illuminated image, the pixel density, and the reference height determined by the fiducial marker analyzer 114. For example, to generate the photography product, the subject-illuminated image from the set of images may be processed based on the pixel density and the reference height to ensure that features of the individual subjects are represented accurately relative to other subjects in the composite group image 118. For examples, the composite group image assembler 116 can scale the subject-illuminated image based on the pixel density and the reference height relative to pixel densities of images captured other subjects and reference heights of the other subjects. Additionally, the composite group image assembler 116 can further scale the subject-illuminated image based on a position of the subject relative to positions of each other subject in the composite group image 118. The composite group image assembler 116 can arrange the processed image of the subject (e.g., the photography product) among processed images of the other subjects of the group to generate the composite group image 118.

Additional processing of the set of images can be performed by the composite group image generator 112. For example, a mask can be generated, where the mask can be scaled similarly to the subject-illuminated image. In some examples, the composite group image assembler 116 performs background replacement using the mask, or perform other edits or transformations to generate the composite group image 118. Details of the additional processing are described in detail below with reference to FIG. 12.

The above description of system 100 provides examples of some of the possible environments in which a photography station 102 and an image processing system 110 can be implemented. Other embodiments are implemented in yet other systems or environments. Any of the systems described herein can be implemented by one or more devices as additional embodiments.

Figure 2:
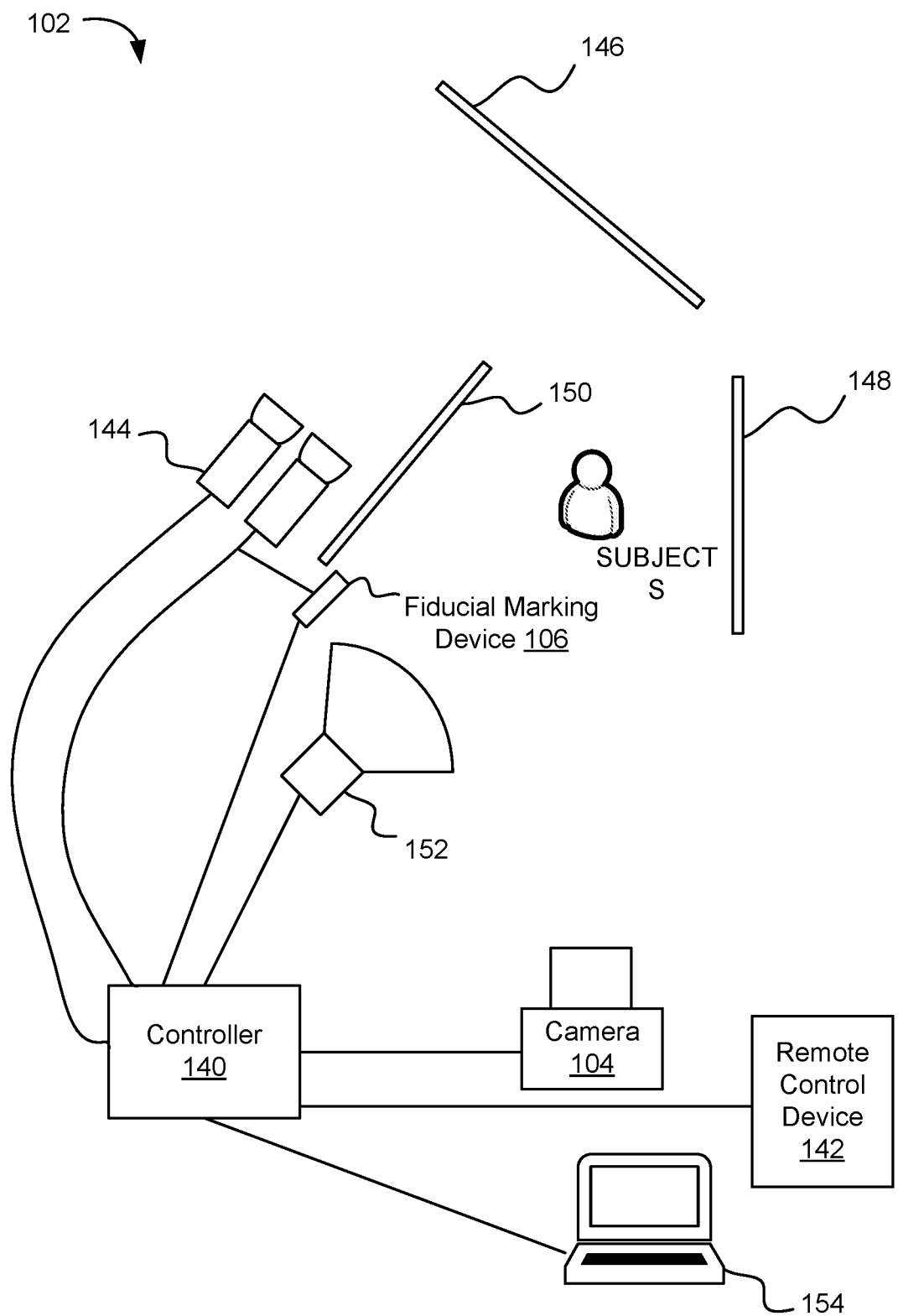
FIG. 2 illustrates an example photography station.

FIG. 2 illustrates an example photography station 102. The photography station can include the camera 104, the fiducial marking device 106, a controller 140, a remote control device 142, background lights 144, a background 146, a fill reflector 148, a light block 150, a main light 152, and a remote computing device 154. Other embodiments can include more or fewer components. The angles, sizes and relative positioning between components in FIG. 2 are not meant to be limiting.

A subject S can be positioned in front of the camera 104. The subject S is one or more of, or a combination of, a person, animal, or object. The camera 104 is a digital camera, examples of which are described in more detail below and particularly with reference to FIG. 5. The camera 104 is in wired or wireless communication with controller 140.

The fiducial marking device 106 includes one or more fiducial light sources, examples of which are described in more detail below and particularly with reference to FIG. 6. The fiducial light sources operate to emit collimated light to form one or more fiducial markers on the subject S during one or more fiducially marked image captures by the camera 104. In some examples, the fiducial marking device 106 includes one or more stands to support and elevate the fiducial light sources. A circuit, shown and described in detail with reference to FIG. 7, can drive emission of the collimated lights during the fiducially marked image captures. The fiducial marking device 106 and/or the circuit is in wired or wireless communication with controller 140. In some examples, the fiducial marking device 106 is also in communication with the background lights 144.

The remote control device 142 can be used to initiate the image capture sequence performed by the camera 104. The remote control device 142 is in wired or wireless communication with controller 140. For example, remote control device 142 can communicate with the controller 140 via infrared signal emission, radio frequency, Bluetooth, Wi-Fi, and other wireless communication protocols known in the art. The remote control device 142 can be a separate physical component with one or more buttons, an interface on a smart computing device such as a smart phone or the remote computing device 154, and a button integrated into the camera 104.

The remote computing device 154 can provide a user interface for the photographer to input information. For example, the photographer can use the remote computing device 154 to input information about a photography session such as a job reference number, information about the subject, order information including types of products, quantity and/or size of each type of product, and any requested finishing techniques such as red eye removal, stray hair removal, and blemish removal. Input devices of the remote computing device 154 can include a keyboard, a pointer input device, a microphone, and a touch sensitive display. Additionally, the remote computing device 154 can have a reader for scanning machine-readable codes. For example, in some instances at least a portion of the session information is encoded in a barcode, QR code, or other similar machine-readable code that is scanned by the remote computing device 154. Examples of the remote computing device 154 can include a desktop computer, a laptop computer, a tablet computer, a mobile device (such as a smart phone, an iPod® mobile digital device, or other mobile devices), or other devices configured to process digital instructions.

The controller 140 synchronizes the illumination of the background lights 144, the main light 152, and the fiducial light sources of the fiducial marking device 106 with the image capture sequence of the camera 104. The background lights 144 can be a component of a background lighting system that operate to illuminate the background 146 during one or more background-illuminated image captures. In some examples, a background lighting system includes at least two background lights 144, where light from one of the background lights 144 is illuminated for the first background-illuminated image capture and light from the other of the background lights 144 is illuminated for the second background-illuminated image capture.

In some examples, the background lighting system includes one or more stands to support and elevate the background lights 144. In addition, the background lighting system can include one or more light modifiers, such as an umbrella or soft box, which diffuses the light from the background lights 144 to provide the desired lighting pattern and distribution. The background lights 144 can be a panel of light emitting diodes, as shown and described in U.S. patent application Ser. No. 13/346,471, the entirety of which is hereby incorporated by reference. The background lights 144 can also be a fast-recharge monolight.

The light block 150 prevents most or all of the light from the background lights 144 from illuminating the subject S. In some examples, the background lights 144 are oriented substantially orthogonal to the background 146, although other angles can be used. The background lights 144 and the light block 150 can be positioned such that they do not appear in the image of the subject S captured by the camera 104.

The background 146 is an object arranged in line with the subject S and the camera 104 to provide a suitable backdrop for images captured by the camera 104. The background 146 can be a background material or a background structure. The background 146 often has an exterior surface having a neutral color. In examples, the exterior surface has a substantially non-textured dark gray color. However, in other examples the exterior surface is textured, and/or other colors are used.

When the background 146 is a background material, the background 146 can include a frame or stand that supports the background material having the exterior surface. In some examples, the background material is substantially opaque, while in other examples the background material is translucent. As one example, the background lights 144 can directly illuminate a rear surface of the background material, and light from the background lights 144 passes through the translucent background material, so that it is visible on the exterior surface.

In other examples, the background 146 is a separate object that is not a part of the photography station 102. Examples of such a background 146 include a wall, a curtain, a whiteboard, or other structure having an exterior surface that can be illuminated by the background lights 144.

In yet another possible embodiment, the background 146 and the background lights 144 are integrated in a same device. In this example, the background lights 144 are positioned behind the subject S and within the view of the camera 104, such that light generated by the background lights 144 is directly visible by the camera 104 rather than indirectly illuminating the background 146. In some embodiments, the background lighting system also includes a display device, such as a flat panel display. Examples of flat panel displays include LED displays, plasma displays, digital light processing displays, and the like, many of which are commonly used as television or computer displays. Such a display can alternatively be arranged behind the background 146 to illuminate the background 146 from behind.

The fill reflector 148 is a screen, panel, light or a substantially flat surface such as a wall. The fill reflector 148 can have low to medium reflective qualities. Generally, pure reflective surfaces, such as a mirrored surface, are not used as a fill reflector. In some examples, the fill reflector 148 is substantially monochrome and can be a white, off-white or gray color. The fill reflector 148 is a way to provide soft light on the left side of the subject S so that the subject-illuminated image does not show shadowing on the subject. In the example arrangement shown in FIG. 2, the main light 152 is positioned generally to the right of the subject S. In that arrangement, some of the light from the main light 152 reflects off the fill reflector 148 and onto the left side of the subject S.

The main light 152 can be a component of a subject lighting system that operates to provide appropriate foreground illumination of the subject S during a subject-illuminated image capture. The main light 152 can include one or more light sources and additional lighting components, such as a fill lighting system. A variety of different light sources can be used, such as incandescent, fluorescent, high-intensity discharge, and light emitting diode light sources. The controller 140 operates to control the flashing of the main light 152 during the subject-illuminated image capture.

The subject lighting system can include one or more stands to support and elevate the light sources of the main light 152. In addition, the subject lighting system can include one or more light modifiers, such as an umbrella or soft box, which diffuses the light from the light sources of the main light 152 to provide the desired lighting pattern and distribution.

Figure 3:
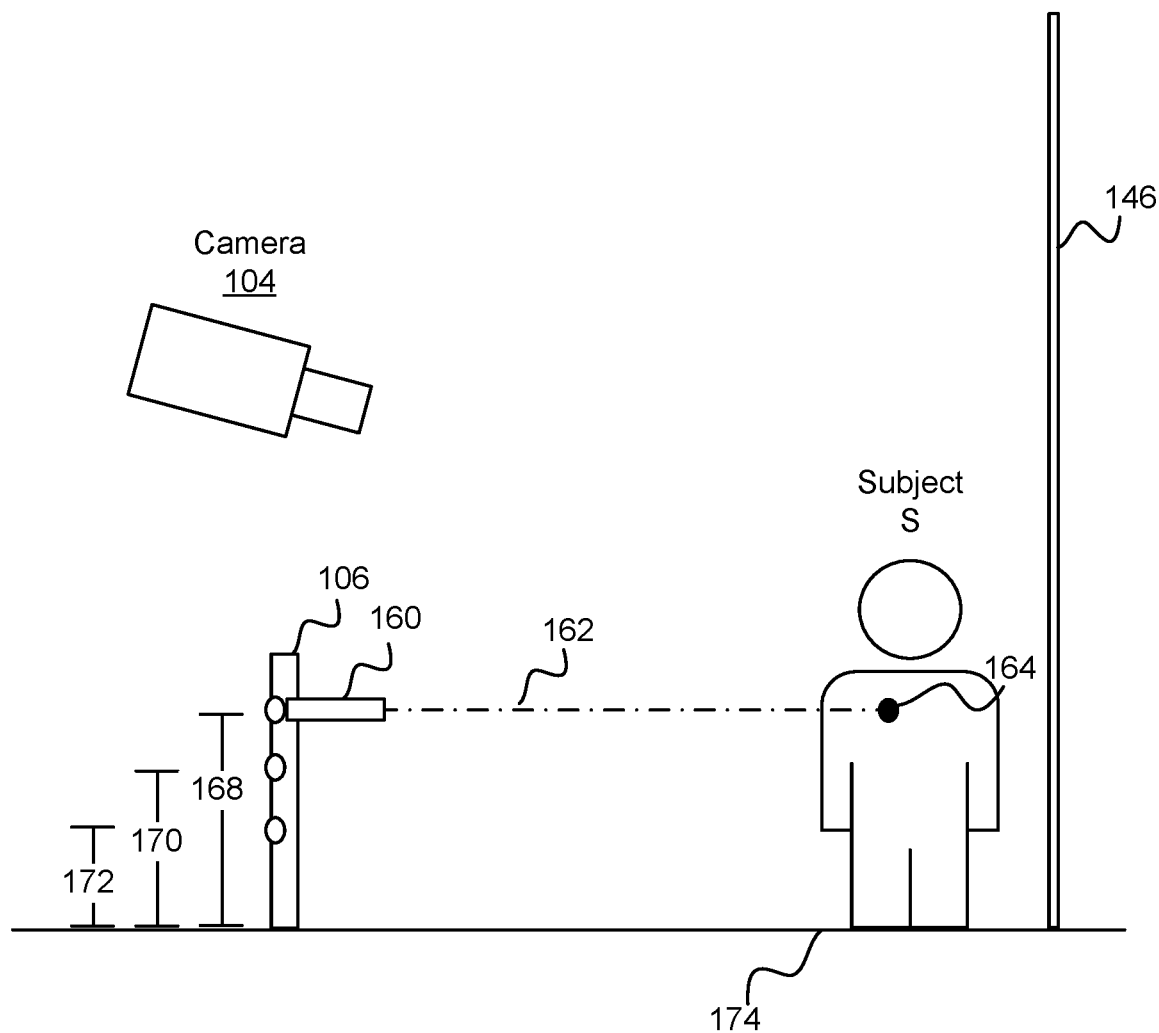
FIG. 3 illustrates a side perspective of a camera and a fiducial marking device having at least one fiducial light source.

FIG. 3 illustrates an example side perspective of the camera 104 and the fiducial marking device 106 having at least one fiducial light source 160. The camera 104 and the fiducial marking device 106 can be components of the example photography station 102 shown and described with reference to FIG. 2. The fiducial light source 160 emits collimated light 162 to form a fiducial marker 164 on the subject S during fiducially marked image captures by the camera 104, where a fiducially marked image capture can be one type of image capture in an image capture sequence described in detail below with reference to FIG. 11.

The fiducial light source 160 can include a laser, a light emitting diode, a halogen light source, a fluorescent light source, or other similar light source operable to transmit the collimated light 162, where a color of the collimated light 162 can be selectable. A circuit of the fiducial marking device 106 can drive the emission of the collimated light 162. The fiducial marking device 106 is in wired or wireless communication with the controller 140. In some examples, the controller 140 communicates directly with the circuit to synchronize the emission with the fiducially marked image capture performed by the camera 104.

The fiducial light source 160 can be mounted or otherwise positioned on the fiducial marking device 106 such that the collimated light 162 is emitted at a first calibrated height 168 relative to a surface 174 (e.g., a floor) on which the subject S is standing on. A position of the fiducial light source 160 can be automatically or manually adjusted along the fiducial marking device 106 such that the collimated light 162 is emitted at a different calibrated height, such as a second calibrated height 170 and a third calibrated height 172. The second calibrated height 170 and the third calibrated height 172 are also relative to the surface 174 on which the subject S is standing on. As one example, the position of the fiducial light source 160 can be adjusted based on a height of the subject S. For example, the position of the fiducial light source 160 can be adjusted based on the height of the subject S such that, when activated, the collimated light 162 emitted from the fiducial light source 160 forms the fiducial marker 164 on the subject S. In some examples, it can be desirable for the calibrated height to correspond to a particular portion of the subject S, where the particular portion can be based on a length of image being captured (e.g., a full body length image, a three-quarter body length image, or a head and shoulder image).

In some examples, if the fiducial marking device 106 has more than one fiducial light source, each fiducial light source can be mounted or otherwise positioned along the fiducial marking device such that the respective collimated lights are emitted at different calibrated heights. For example, three fiducial light sources can be arranged in a linear array along the fiducial marking device 106 such that the respective collimated lights are emitted at the first calibrated height 168, the second calibrated height 170, and the third calibrated height 172, respectively. A fiducial light source to be activated can be selected based on the height of the subject S. For example, for a tall adult, the fiducial light source 160 mounted or otherwise positioned such that the collimated light 162 is emitted at the first calibrated height 168 can be selected.

In some examples, a full length image of the subject S that includes the surface 174 on which the subject S is standing can be captured with the camera 104 for at least the fiducially marked image capture. By capturing the full length image when the collimated light 162 is being emitted from the fiducial light source 160, the fiducially marked image can include the fiducial marker 164 formed by the collimated light 162 and the surface 174.

Once the fiducially marked image is captured by the camera 104, a location of the fiducial marker 164 can be determined. For example, at least a vertical pixel location of the fiducial marker 164 is determined, as described in more detail with reference to FIG. 13. Based on the location of the fiducial marker 164, two unique values can be determined that affect how a subject-illuminated image of the subject S captured independently from the fiducially marked image is scaled and/or resized to generate a photography product of the subject S for inclusion with the composite group image 118, among other examples.

The two unique values can include a pixel density and a reference height of the subject. The first calibrated height 168 is known, which is the vertical distance in inches, for example, from the surface 174 to a vertical location from which the collimated light 162 is emitted from the light source 160. A vertical distance in pixels between a vertical pixel location of the surface 174 and a vertical pixel location of the fiducial marker 164 can be determined from the fiducially marked image. Therefore, the pixel density, which is a number of pixels in an image per inch (or other similar measure of distance, such as centimeters, millimeters, etc.), can be determined by dividing the vertical distance in pixels by the known calibrated height. The reference height of the individual subject can be the vertical pixel location of the fiducial marker 164 in the image.

Figure 4:
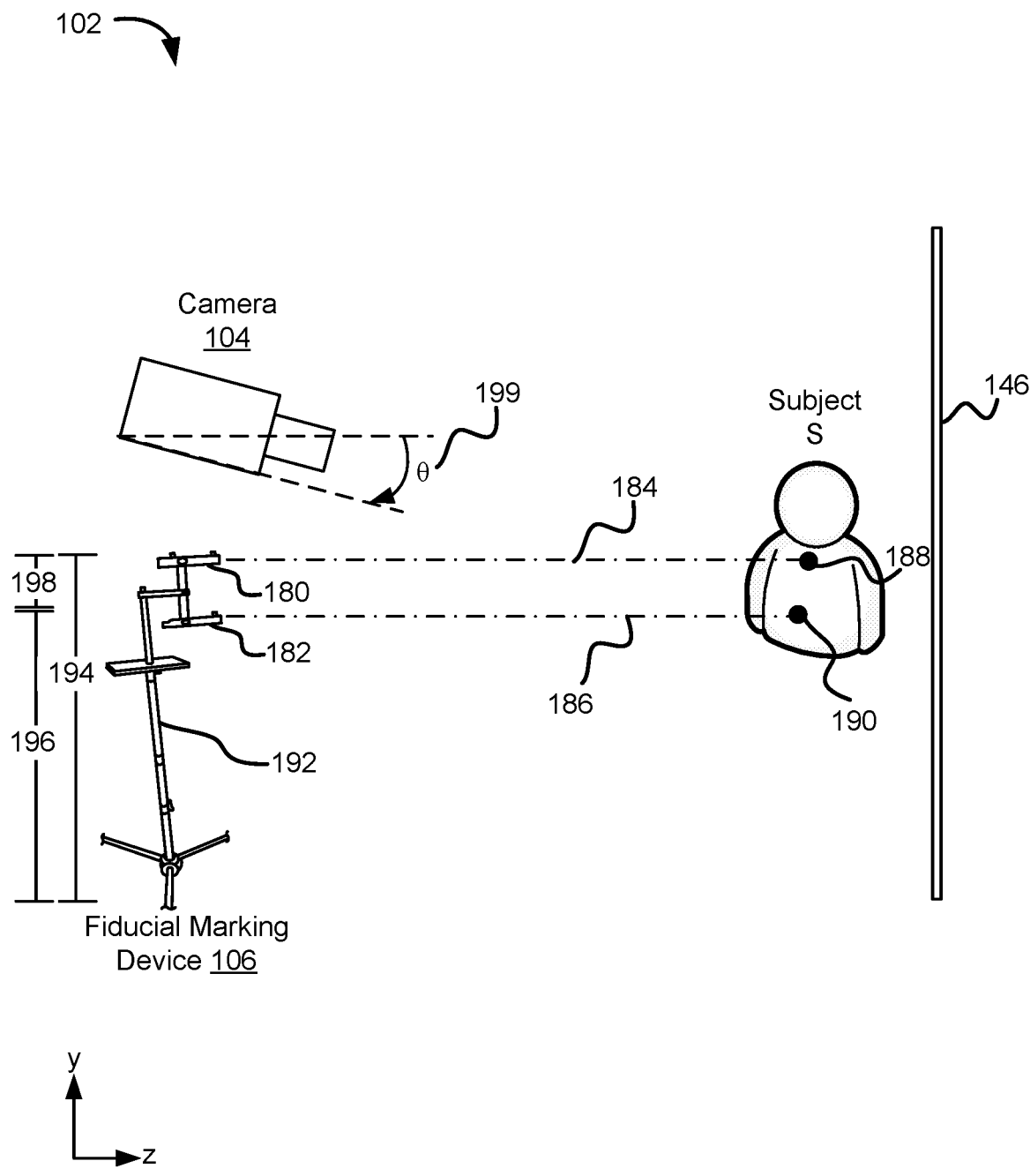
FIG. 4 illustrates a side perspective of a camera and a fiducial marking device having at least two fiducial light sources.

FIG. 4 illustrates an example side perspective of the camera 104 and the fiducial marking device 106 having at least two fiducial light sources. The camera 104 and the fiducial marking device 106 can be components of the example photography station 102 shown and described with reference to FIG. 2. As illustrated, the fiducial marking device 106 includes a first fiducial light source 180 and a second fiducial light source 182 that are arranged substantially parallel to one another. The first fiducial light source 180 emits a first collimated light 184 and the second fiducial light source 182 emits a second collimated light 186 during fiducially marked image captures. A fiducially marked image capture can be one type of image capture in an image capture sequence described in detail below with reference to FIG. 11.

Due to the parallel arrangement of the first fiducial light source 180 and the second fiducial light source 182, a distance of the subject from the fiducial marking device 106 can be variable and does not affect the formation of fiducial markers within the fiducially marked images captured by the camera 104. However, if a different photography station 102 is used to capture one or more of the subjects, the first fiducial light source 180 and the second fiducial light source 182 should be positioned at a same height within the fiducial marking device 106 in each photography station 102. Alternatively, if the first fiducial light source 180 and the second fiducial light source 182 are positioned at different heights among the fiducial marking devices 106 of the different photography stations 102, at least calibration information needs to be gathered and stored. Calibration information is gathered by photographing an object of known height, such as a ruler, and performing a calibration using the image of the object of known height.

The first fiducial light source 180 and the second fiducial light source 182 can include a laser, a light emitting diode, a halogen light source, a fluorescent light source, or other similar light source operable to transmit collimated light. A color of collimated light emitted by the first fiducial light source 180 and the second fiducial light source 182 can be selectable, where the collimated light emitted by one fiducial light source can be a same color or a different color as the collimated light emitted by another fiducial light source. Example colors can include red, blue, green or white. In some examples, the color can be selected or adjusted based on a color of clothing worn by the subject S. For example, a color that provides better signal-to-noise ratio can be selected.

Emission of the first collimated light 184 and the second collimated light 186 forms a first fiducial marker 188 and a second fiducial marker 190 on the subject S, respectively, that are captured in the fiducially marked image. In some examples, the first collimated light 184 and the second collimated light 186 are emitted for about 16 milliseconds or less. Therefore, due to the brief emission duration, the subject S will not notice the first collimated light and the second collimated light 186.

A circuit of the fiducial marking device 106 can drive the emission of the first collimated light 184 and the second collimated light 186. The fiducial marking device 106 is in wired or wireless communication with the controller 140. In some examples, the controller 140 communicates directly with the circuit to synchronize the emission with the fiducially marked image capture performed by the camera 104.

The fiducial marking device 106 can include one or more stands 192 to support and arrange the first fiducial light source 180 and the second fiducial light source 182 substantially parallel to on another. Additionally, in some examples, the first fiducial light source 180 and the second fiducial light source 182 are each positioned such that the first collimated light 184 and the second collimated light 186 both fall below the subject's head. In one example, the first fiducial light source 180 is positioned such that the first collimated light 184 is emitted at a vertical location 194 that is forty-seven inches above the floor and the second fiducial light source 182 is positioned such that the second collimated light 186 is emitted at a vertical location 196 that is forty inches above the floor. Resultantly, a vertical distance 198 between the first collimated light 184 and the second collimated light 186 is seven inches.

The position of the first fiducial light source 180 and the second fiducial light source 182 can be adjusted within the fiducial marking device 106 to account for a wide range of subject heights. In some examples, the adjustment can be performed manually. In other examples, the adjustment can be performed automatically by an adjustment mechanism within the fiducial marking device 106. For example, the adjustment mechanism can identify clothing of an upper body of the subject S and adjust the position of the first fiducial light source 180 and/or the second fiducial light source 182 accordingly. Additionally, the fiducial marking device 106 can have a third fiducial light source to facilitate the wider range of subject heights.

In some examples, the fiducial marking device 106 is positioned separately from the camera 104, and thus is not on a same optical axis of the camera 104. As a result, in some cases, the reflection of the first collimated light 184 and/or the second collimated light 186 off of the subject S (e.g., the first fiducial marker 188 and/or the second fiducial marker 190 formed) can be covered by the subject S as viewed by the camera 104. For example, a marker could fall just under a chin of the subject S or a marker could be lost inside a shirt of the subject S. In some examples, if the first fiducial marker 188 and/or the second fiducial marker 190 are not captured in the fiducially marked image, an alert can be generated. The alert can be provided to the photographer through the camera 104 or the remote computing device 154, for example, to notify the photographer. In some examples, the alert can prompt the photographer to re-initiate the image capture sequence.

Although two fiducial light sources are shown and described in FIG. 4, in other examples, the fiducial marking device 106 can have only a single fiducial light source that emits a single collimated light as shown and described in FIG. 3. Additionally, the fiducial marking device 106 can be have single fiducial light source along with a beam splitter or diffractive optical element. The beam splitter or diffractive optical element operate to separate a single collimated light emitted from the single fiducial light source into the first collimated light 184 and the second collimated light 186 that form the first fiducial marker 188 and the second fiducial marker 190 on the subject S, respectively, during the fiducially marked image capture. In further examples, the fiducial marking device 106 can have one or more additional fiducial light sources (e.g., three or more fiducial light sources) that operate to emit collimated light to form three or more fiducial markers on the subject S in a linear array or in a grid pattern, for example, during the fiducially marked image capture. In yet further examples, a lens can be placed in front of the collimated light to create a line of collimated light at the subject. This can facilitate visibility of the fiducial marker on the subject formed from the collimated light (e.g., prevent cases where a fiducial marker is buried inside the subject's clothing rendering it invisible in the fiducially marked image).

Once a fiducially marked image is captured by the camera 104, a location of the first fiducial marker 188 and a location of the second fiducial marker 190 in the fiducially marked image can be determined. For example, a vertical pixel location and a horizontal pixel location of the first fiducial marker 188 and a vertical pixel location and a horizontal pixel location of the second fiducial marker 190 are determined, as described in more detail with reference to FIG. 13. Based on the location of the first fiducial marker 188 and the second fiducial marker 190, two unique values can be determined that affect how a subject-illuminated image of the subject is scaled and/or resized to generate a photography product for inclusion with the composite group image 118, among other examples. The two unique values include a pixel density and a reference height of the subject.

If the subject is two dimensional (e.g., an object having only a height and a length), the first fiducial marker 188 and the second fiducial marker 190 would be at a same horizontal pixel location and each have a known vertical location corresponding to the vertical location 194 and vertical location 176. However, most subjects are three-dimensional, therefore a compensation for how the first collimated light 184 and the second collimated light 186 reflect off of the subject is needed to account for the three-dimensional effect when determining the pixel density and the reference height.

In some examples, the compensation is based on the relative horizontal pixel locations of the first fiducial marker 188 and the second fiducial marker 190 in the fiducially marked image. For example, the compensation can differ when the horizontal pixel location of the first fiducial marker 188 is lesser than or equal to the horizontal pixel location of the second fiducial marker 190 versus when the horizontal pixel location of the first fiducial marker 188 is greater than the horizontal pixel location of the second fiducial marker 190. Additionally, the compensation can be dependent on a tilt angle 199 of the camera 104. The value determination and associated compensation are described in greater detail below with reference to FIGS. 11 and 12.

Figure 5:
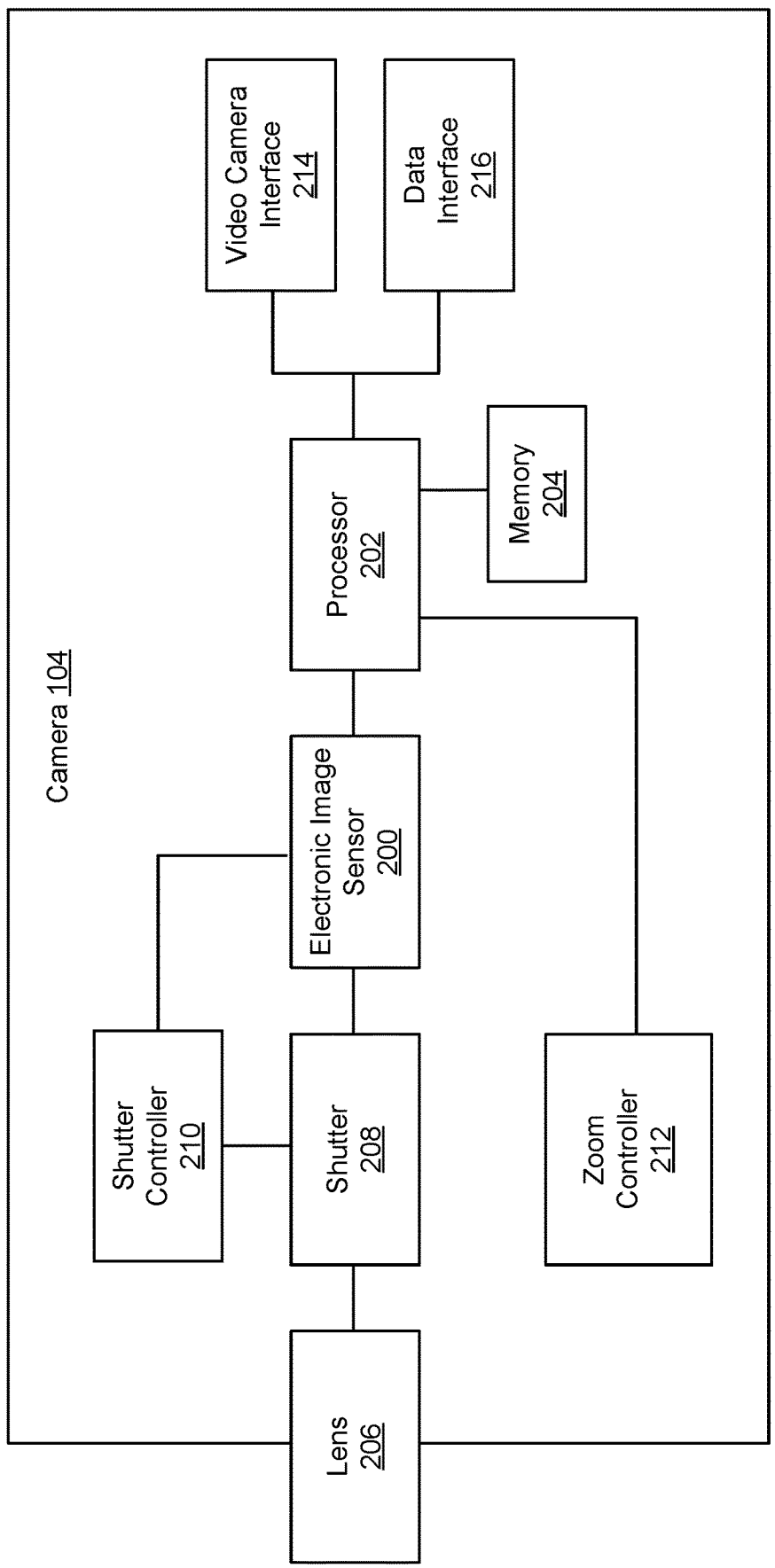
FIG. 5 is a schematic block diagram of a camera.

FIG. 5 is a schematic block diagram of the camera 104. The camera 104 can be a mirrorless digital camera including at least an electronic image sensor 200 for converting an optical image to an electric signal, a processor 202 for controlling the operation of the camera 104, and memory 204 for storing the electric signal in the form of digital image data. A commercially available example of a mirrorless camera is the Nikon 1V3 available from Nikon Corporation.

An example of electronic image sensor 200 is a charge-coupled device (CCD). Another example of electronic image sensor 200 is a complementary metal-oxide-semiconductor (CMOS) active-pixel sensor. Electronic image sensor 200 receives light from a subject and background and converts the received light into electrical signals. The signals are converted into a voltage, which is then sampled, digitized, and stored as digital image data in the memory 204.

The memory 204 can include various different forms of computer readable storage media, such as random access memory. In some examples, the memory 204 includes a memory card. A wide variety of memory cards are available for use in various embodiments. Examples include: a CompactFlash (CF) memory card (including type I or type II), a Secure Digital (SD) memory card, a mini Secure Digital (mini SD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

A lens 206 is located in front of a shutter 208 and is selected to provide the appropriate photographic characteristics of light transmission, depth of focus, etc. The shutter 208 can be mechanical, electrical, or both. In some embodiments, the lens 206 is selected between 50 and 250 mm, with the image taken at an f-stop generally in the range of f16 to f22; in the range of f4 to f16; or in the range of f4 to f22. This provides a zone focus for the image. It also generally eliminates concerns regarding ambient light. However, it will be appreciated that any number of lenses, focusing, and f-stops may be employed in connection with the present invention.

To initiate an image capture sequence, an image capture button on the remote control device 142 is preferably used. In some examples, the remote control device 142 is connected to the controller 140, which generates a shutter release signal that is communicated to a shutter controller 210 of the camera 104. However, other methods and devices can be used to initiate the image capture. For example, a button, switch or other device might be included on the controller 140 or connected to the camera 104. Still further, a computing device, such as the remote computing device 154 or the image processing system 110, is used in some embodiments to initiate the process.

A zoom controller 212 is also provided in some examples to mechanically adjust the lens 206 to cause the camera 104 to zoom in and out on a subject. The remote control device 142 can include zoom in and out buttons, and signals from the remote control device 142 are communicated to the controller 140, which communicates the request to the zoom controller 212. In some examples, the zoom controller 212 includes a motor that adjusts lens 206 accordingly.

The camera 104 can further include a video camera interface 214 and a data interface 216. The video camera interface 214 can communicate live video data from the camera 104 to the controller 140 (or computing device 340) in some embodiments. In some embodiments, the video camera interface 214 communicates live video data from the camera 104 to the remote computing device 154 or a digital display on the camera 104.

The data interface 216 is a data communication interface that sends and receives digital data to communicate with another device, such as controller 140 or the image processing system 110. For example, the data interface 216 can receive image capture messages from the controller 140 that instruct the camera 104 to capture one or more digital images. The data interface 216 can also transfer captured digital images, such as the images of the individual subjects 108 from the memory 204 to another device, such as the controller 140 or the image processing system 110. Examples of the video camera interface 214 and the data interface 216 include USB interfaces. In some examples, the video camera interface 214 and the data interface 216 are a same interface, while in other examples, they are separate interfaces.

Figure 6:
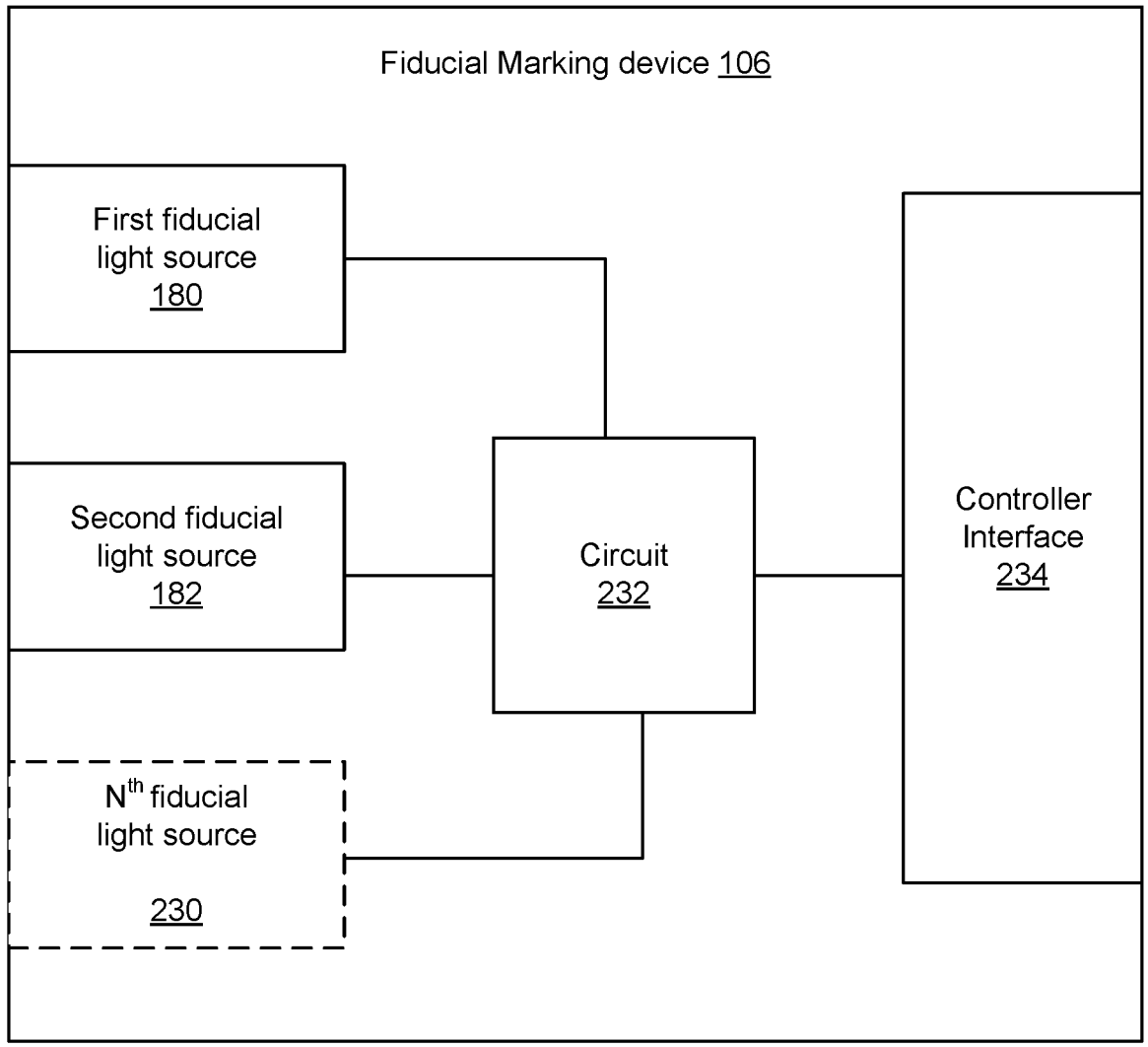
FIG. 6 is a schematic block diagram of a fiducial marking device.

FIG. 6 is a schematic block diagram of the fiducial marking device 106. The fiducial marking device 106 includes fiducial light sources 180, 182, and 230, a circuit 232, and a controller interface 234.

The fiducial light sources 180, 182, and 230 can include lasers, light emitting diodes, halogen light sources, fluorescent light sources, or other similar light sources operable to transmit collimated light. A color of the collimated light emitted by the fiducial light sources 180, 182, and 230 can be selectable, where the collimated light emitted by one fiducial light source can be a same color or a different color as the collimated light emitted by another fiducial light source. In some examples, the color can be selected or adjusted based on a color of clothing worn by a subject. For example, a color that provides better signal-to-noise ratio can be selected. The color can be red, blue, green or white.

In some examples, the fiducial marking device 106 includes the first fiducial light source 180 and the second fiducial light source 182, as shown and described in FIG. 4. The first fiducial light source 180 emits the first collimated light 184 and the second fiducial light source 182 emits the second collimated light 186. Emission of the first collimated light 184 and the second collimated light 186 forms a first fiducial marker 188 and a second fiducial marker 190 on the subject. The first fiducial light source 180 and the second fiducial light source 182 can be arranged substantially parallel to one another such that the emitted first collimated light 184 and the second collimated light 186 form the first fiducial marker 188 substantially parallel to the second fiducial marker 190 on the subject S. In some examples, the first fiducial light source 180 and the second fiducial light source 182 are positioned such that the first fiducial marker 188 and the second fiducial marker 190 are arranged vertically, horizontally, or diagonally to one another.

In other examples, in addition to the first fiducial light source 180 and the second fiducial light source 182, the fiducial marking device 106 includes one or more additional fiducial light sources up to an $N^{th}$ fiducial light source 230. The additional fiducial light sources can continue to be arranged substantially parallel to one another such that the emitted collimated light forms a linear array of fiducial markers on the subject S during the fiducially marked image captures. In other examples, the additional fiducial light sources can be arranged such that the emitted collimated light forms a grid pattern of fiducial markers on the subject S during the fiducially marked image captures.

In further examples, the fiducial marking device 106 can have only a single fiducial light source, such as the first fiducial light source 180, along with a beam splitter or diffractive optical element to split a single emitted collimated light into the first collimated light 184 and the second collimated light 186 to form the first fiducial marker 188 and the second fiducial marker 190 on the subject S during the fiducially marked image captures. Alternatively, the fiducial marking device 106 can have a single fiducial light source that emits a single collimated light, similar to the fiducial light source 160 shown and described with reference to FIG. 3.

The circuit 232 of the fiducial marking device 106 can drive the emission of the collimated light from the fiducial light sources 180, 182, and 230. In some examples, the circuit 232 is integrated with the fiducial marking device 106 as illustrated. In other examples, the circuit 232 is a separate device from the fiducial marking device 106. The circuit 232 is shown and described in greater detail below with reference to FIG. 7.

The fiducial marking device 106 is in wired or wireless communication with the controller 140 via the controller interface 234. In some examples, the controller 140 communicates directly with the circuit 232 to synchronize the emission of the collimated light with the fiducially marked image capture of an image capture sequence performed by the camera 104.

Figure 7:
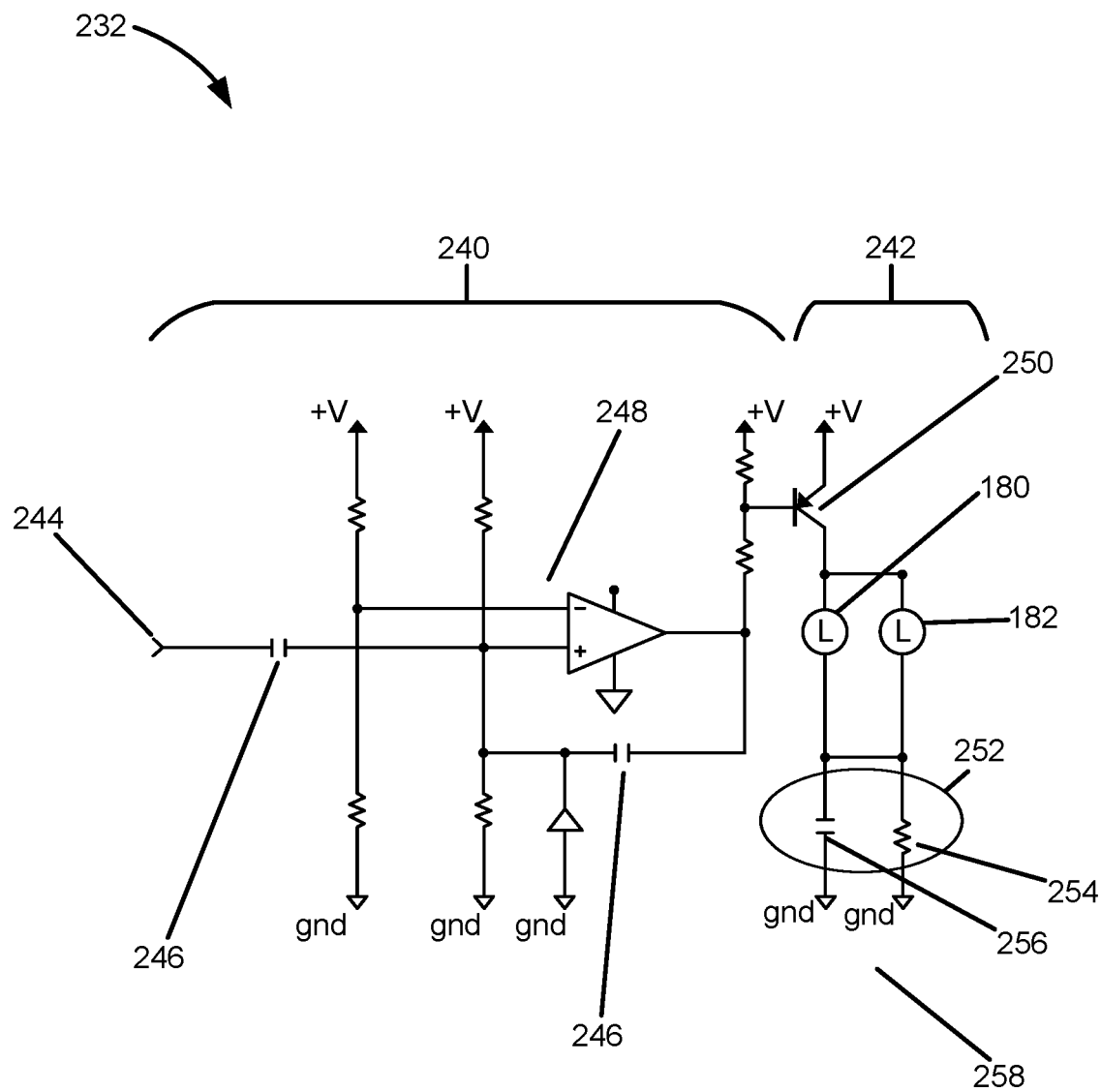
FIG. 7 is an example of a circuit that drives fiducial light sources.

FIG. 7 is an example of the circuit 232 previously discussed with reference to FIG. 6. The circuit 232 can include switch circuitry 240 and drive circuitry 242. The switch circuitry 240 can include an input 244, capacitors 246, and an operational amplifier 248, among other circuitry. The drive circuitry 242 can include a transistor 250 coupled to the first fiducial light source 180 and the second fiducial light source 182, a combination element 252 that includes a resistor 254 and a capacitor 256, and an output 258, among other circuitry.

In some examples, the capacitors 246 and the operational amplifier 248 of the switch circuitry 240 work in combination to control a time period during which the transistor 250 of the drive circuitry 242 remains on. As one example, a signal can be received via the input 244 that causes the switch circuitry 240 to switch on the transistor 250. When switched on, the transistor 250 drives (e.g., powers on) the first fiducial light source 180 and the second fiducial light source 182 to emit collimated light. In some examples, the signal is received in response to an illumination or flash of the background lights (shown in FIG. 2) such that the collimated light is emitted synchronously with the background lights 144. The transistor 250 remains on for the time period controlled by the switch circuitry 240. For example, the time period is associated with a first time period. Once the first time period lapses, the switch circuitry 240 switches off the transistor 250, which causes the first fiducial light source 180 and the second fiducial light source 182 to power off and cease emitting the collimated light.

The combination element 252 at the output 258 of the drive circuitry 242 that includes the resistor 254 and the capacitor 256 provides a backup mechanism to power off the first fiducial light source 180 and the second fiducial light source 182 in case a component in the switch circuitry 240 of the circuit 232 fails causing the transistor 250 of the circuit to remain on. For example, if the transistor 250 remains on past a predetermined time period, the combination element 252 powers off the first fiducial light source 180 and the second fiducial light source 182 to cease the emission of collimated light. In some examples, the predetermined time period is a second time period that is longer than the first time period. As one example, the second time period is around about 50 milliseconds.

Figure 8:
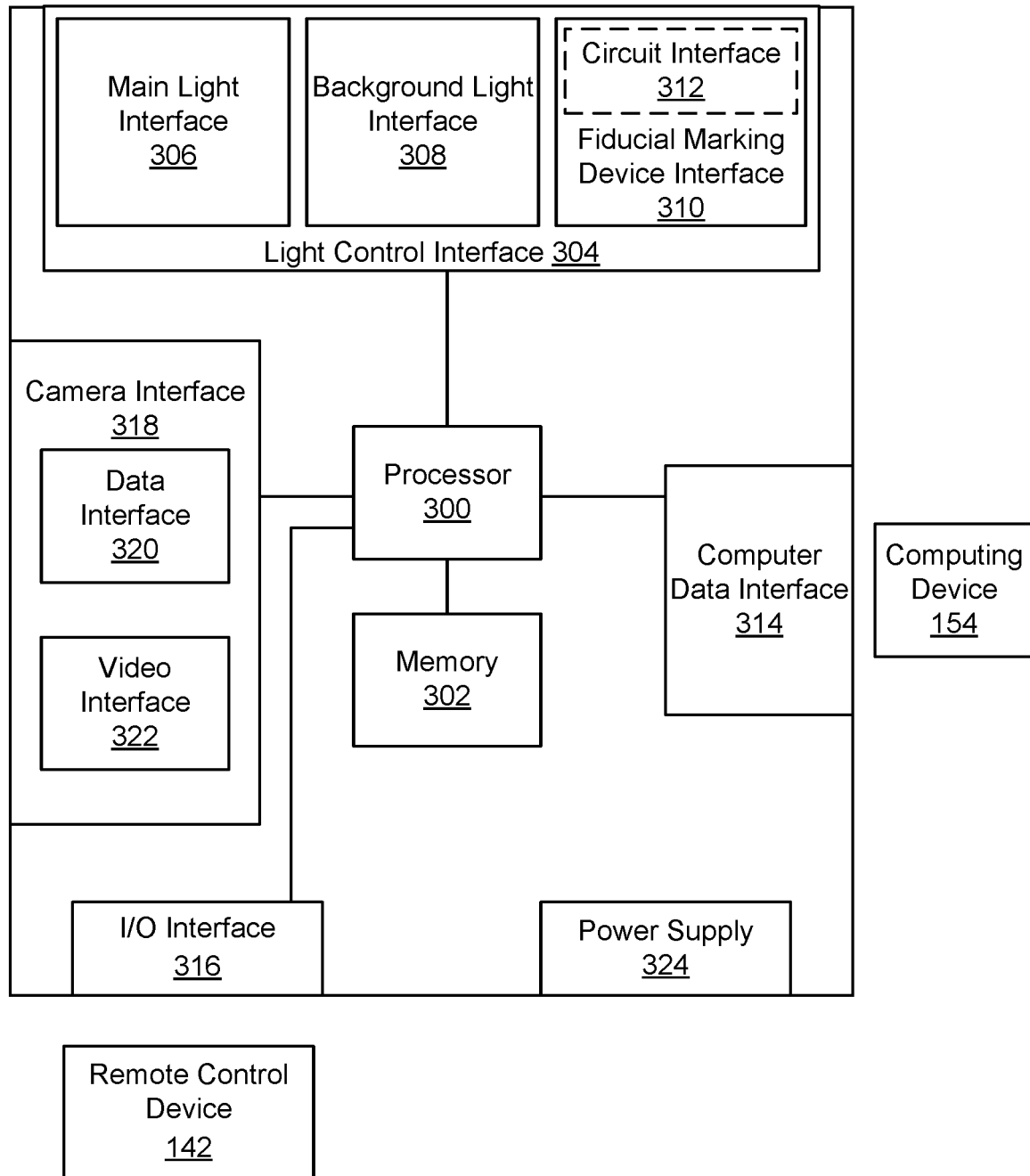
FIG. 8 is a schematic block diagram of an embodiment of a controller of a photography station.

FIG. 8 is a schematic block diagram of the controller 140 of the photography station 102. In this example, the controller 140 includes a processor 300, a memory 302, and a light control interface 304 including a main light interface 306, a background light interface 308 and a fiducial marking device interface 310 that can include a circuit interface 312. The controller 140 also includes a computer data interface 314, an input/output interface 316, a camera interface 318 including a data interface 320 and a video interface 322, and a power supply 324.

The processor 300 can perform control operations of the controller 140, and interfaces with the memory 302. Examples of suitable processors and memory are described herein.

The light control interface 304 allows the controller 140 to control the operation of one or more lights of the photography station 102. For example, the main light interface 306 allows the controller 140 to control the operation of the main light 152 of the subject lighting system. The background light interface 308 allows the controller 140 to control the operation of the background lights 144 of the background lighting system. The fiducial marking device interface 310 allows the controller 140 to control the operation of the fiducial light sources of the fiducial marking device 106, including the first fiducial light source 180 and the second fiducial light source 182. In some examples, the fiducial marking device interface 310 includes the circuit interface to allow the controller 140 to directly drive the circuit 232 of the fiducial marking device 106.

The connection between the controller 140 and the various lighting systems and devices is wired and/or wireless. In some examples, the light control interface 304 is a send only interface that does not receive return communications from the lighting systems and devices. Other examples permit bidirectional communication. The light control interface 304 is operable to selectively illuminate one or more lights at a given time. The controller 140 operates to synchronize the illumination of the lights with the operation of camera 104. For example, the illumination of the lights can be synchronized with an image capture sequence of the camera 104. In some examples, the controller 140 provides one or more triggers or pulses to the background lights 144, the main light 152, and the one or more fiducial light sources of the fiducial marking device 106. In other examples, the controller 140 communicates digital messages that are used to synchronize and control the various operations.

Figure 9:
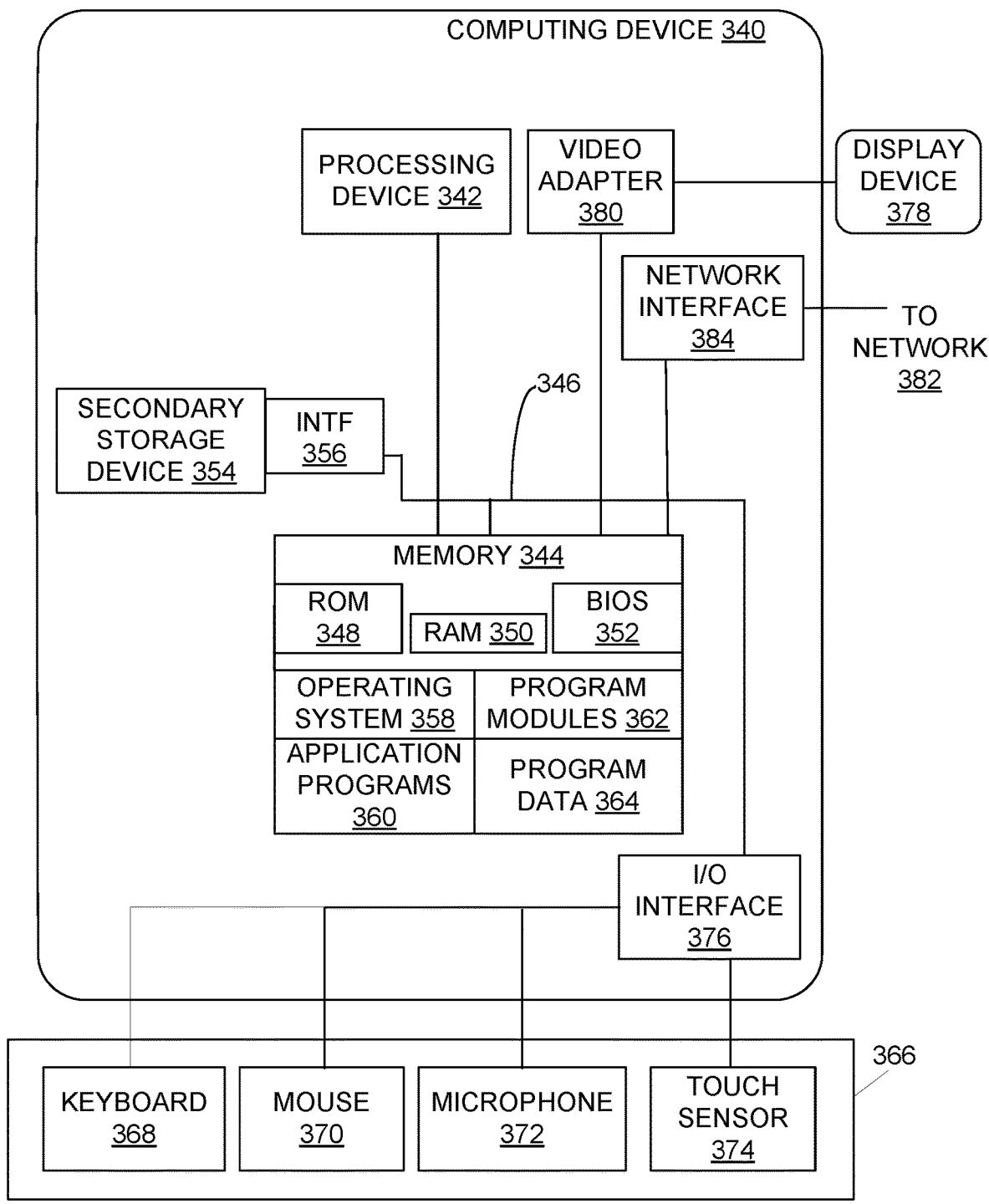
FIG. 9 is a schematic block diagram illustrating an architecture of an example computing device.

The computer data interface 314 allows the controller 140 to send and receive digital data with a computing device (e.g., computing device 340 described in FIG. 9). An example of the computer data interface 314 is a universal serial bus interface, although other communication interfaces are used in other embodiments, such as a wireless or serial bus interface.

One or more input devices, such as the remote control device 142, are coupled to the processor 300 through input/output interface 316. The input devices can be connected by any number of input/output interfaces 316 in various embodiments, such as a parallel port, serial port, game port, universal serial bus, or wireless interface.

The camera interface 318 allows the controller 140 to communicate with the camera 104. In some embodiments, camera interface 318 includes the data interface 320 that communicates with data interface 216 of the camera 104 (shown in FIG. 5), and a video interface 322 that communicates with video camera interface 214 of the camera 104 (also shown in FIG. 5). Examples of such interfaces include universal serial bus interfaces. Other embodiments include other interfaces.

In some examples, a power supply 324 is provided to receive power, such as through a power cord, and to distribute the power to other components of the photography station 102, such as through one or more additional power cords. Other embodiments include one or more batteries. Further, in some examples, the controller 140 receives power from another device.

The controller 140 is arranged and configured to synchronize the illumination of background lights 144, the main light 152, and the fiducial light sources with the image captures, either through wired or wireless communication. In some examples, the controller 140 provides one or more triggers or pulses to the background lights 144, the main light 152, and the fiducial light sources. In other examples, the controller 140 communicates digital messages that are used to synchronize and control the various operations.

FIG. 9 is a schematic block diagram illustrating an architecture of a computing device that can be used to implement aspects of the present disclosure, including the camera 104, the image processing system 110, and the remote computing device 154, and will be referred to herein as the computing device 340.

The computing device 340 is used to execute the operating system, application programs, and software modules (including the software engines) described herein.

The computing device 340 includes, in some embodiments, at least one processing device 342, such as a central processing unit (CPU). A variety of processing devices are available from a variety of manufacturers, for example, Intel or Advanced Micro Devices. In this example, the computing device 340 also includes a system memory 344, and a system bus 346 that couples various system components including the system memory 344 to the processing device 342. The system bus 346 is one of any number of types of bus structures including a memory bus, or memory controller; a peripheral bus; and a local bus using any of a variety of bus architectures.

Examples of computing devices suitable for the computing device 340 include a desktop computer, a laptop computer, a tablet computer, a mobile device (such as a smart phone, an iPod® mobile digital device, or other mobile devices), or other devices configured to process digital instructions.

The system memory 344 includes read only memory 348 and random access memory 350. A basic input/output system 352 containing the basic routines that act to transfer information within the computing device 340, such as during start up, is typically stored in the read only memory 348.

The computing device 340 also includes a secondary storage device 354 in some embodiments, such as a hard disk drive, for storing digital data. The secondary storage device 354 is connected to the system bus 346 by a secondary storage interface 356. The secondary storage devices and their associated computer readable media provide nonvolatile storage of computer readable instructions (including application programs and program modules), data structures, and other data for the computing device 340.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in the secondary storage device 354 or the memory 344, including an operating system 358, one or more application programs 360, other program modules 362, and program data 364.

In some embodiments, the computing device 340 includes input devices to enable a user to provide inputs to the computing device 340. Examples of input devices 366 include a keyboard 368, a pointer input device such as a mouse 370, a microphone 372, and a touch sensitive display 374. Other embodiments include other input devices 366. The input devices are often connected to the processing device 342 through an input/output interface 376 that is coupled to the system bus 346. These input devices 366 can be connected by any number of input/output interfaces, such as a parallel port, serial port, game port, or a universal serial bus. Wireless communication between input devices and interface 376 is possible as well, and includes infrared, Bluetooth® wireless technology, 802.11a/b/g/n, cellular, or other radio frequency communication systems in some possible embodiments.

In this example embodiment, a touch sensitive display device 378 is also connected to the system bus 346 via an interface, such as a video adapter 380. The touch sensitive display device 378 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 378, the computing device 340 can include various other peripheral devices (not shown), such as speakers or a printer.

When used in a local area networking environment or a wide area networking environment (such as the Internet), the computing device 340 is typically connected to the network 382 through a network interface, such as a wireless network interface 384. Other possible embodiments use other communication devices. For example, some embodiments of the computing device 340 include an Ethernet network interface, or a modem for communicating across the network.

In some examples, the computing device 340 includes a power supply that provides electric power to several components and elements of the computing device 340. Examples of the power supply include AC power supplies, DC power supplies, and batteries, either disposable or rechargeable.

The computing device 340 typically includes at least some form of computer-readable media. Computer readable media includes any available media that can be accessed by the computing device 340. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 340.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 10:
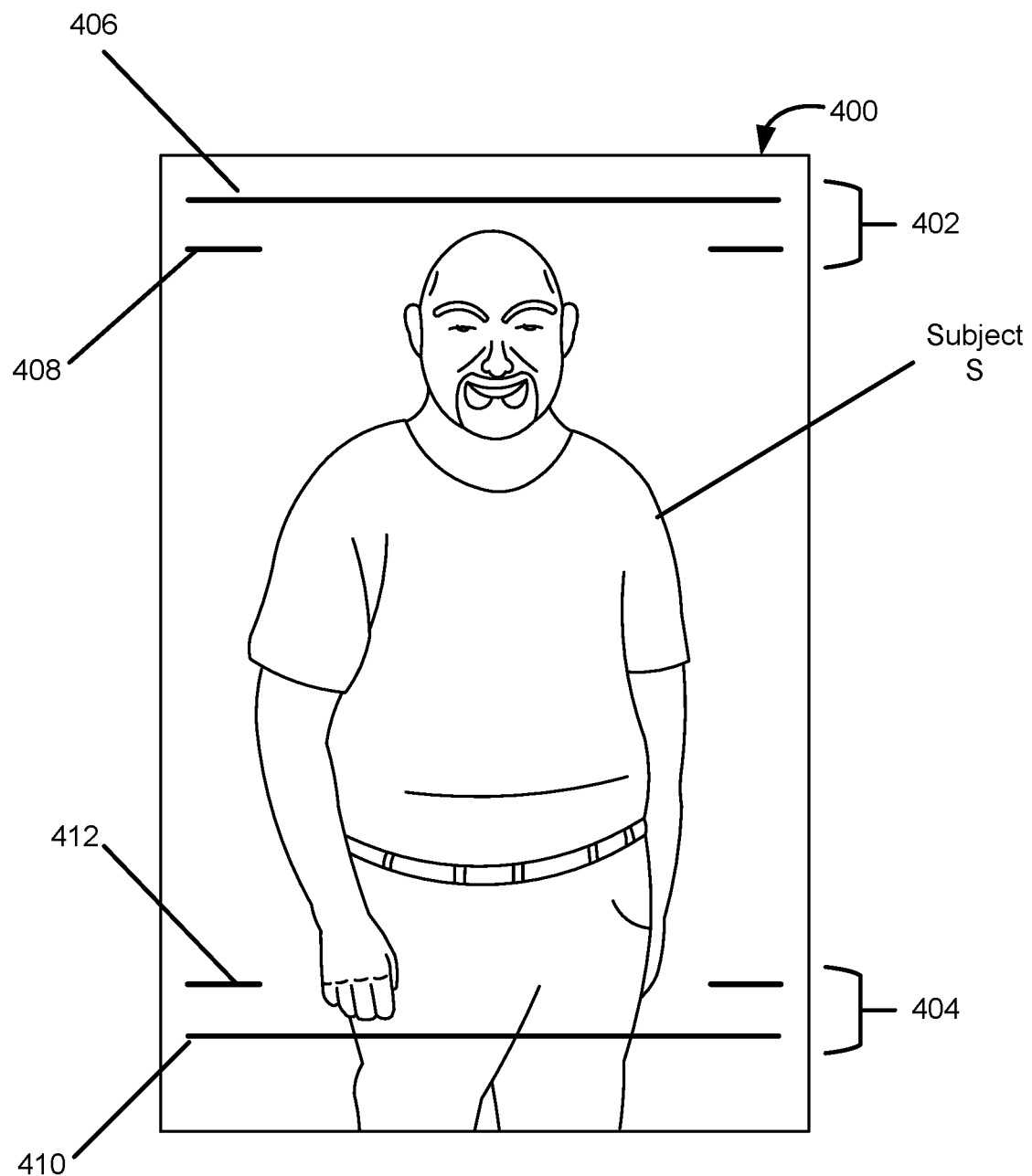
FIG. 10 illustrates example composition rules for capturing a digital image of a subject.

FIG. 10 illustrates example composition rules for capturing a digital image of the subject S. Prior to capturing a digital image of the subject S, a display 400 that includes visual indicators corresponding to image composition rules is provided to aid a photographer in aligning the subject and adjusting the camera (e.g., zooming, focusing, etc.). The display 400 can be provided by a display of the camera 104 and/or a display of the remote computing device 154.

In some examples, the visual indicators include a first set of lines 402 at a top of the display 400 and a second set of lines 404 at a bottom of the display 400. The first set of lines 402 can correspond to a composition rule for positioning a top of the subject's head. For example, the top of the head should be positioned below a top line 406 of the first set of lines 402 and above a bottom line 408 of the first set of lines 402. The second set of lines 404 can correspond to a composition rule for positioning the subject's hands. For example, the hands should fall above a bottom line 410 of the second set of lines 404 and below a top line 412 of the second set of lines 404. Different composition rules can apply to different poses of the subject. A pose is a particular positioning, movement or angle of the subject. For example, poses can include standing, sitting, jumping, among others. As illustrated the first set of lines 402 and the second set of lines 404 can apply to a standing pose of the subject, where an image including the subject's head and shoulders is desired, for example. Additionally, even for a same pose, the composition rules can vary, if one or more of the individual subjects' stature is affected by a disability, for example.

Once the subject S is aligned in accordance with the composition rules, the photographer can initiate an image capture sequence (e.g., by pushing a button on the remote control device 142). The display 400 can be provided in between each image capture sequence to ensure compliance with the composition rules. This can be especially important if the pose of the subject changes between image capture sequences (e.g., if the subject goes from standing to sitting).

Figure 11:
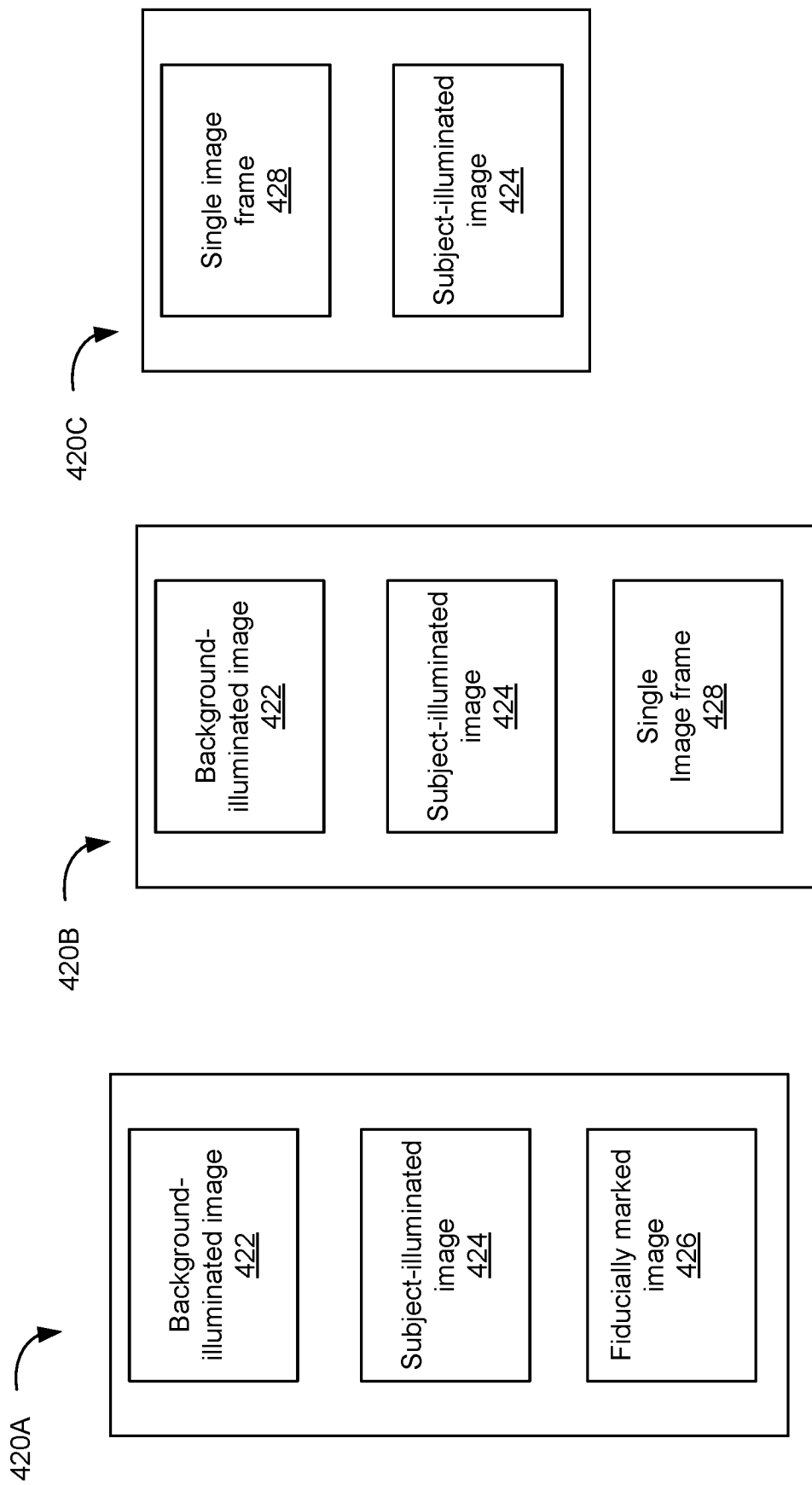
FIG. 11 illustrates an example image capture sequence.

FIG. 11 illustrates example image capture sequences 420A, 420B, 420C performed by the camera 104. In some examples, more than one variation of the image capture sequence can be performed. In some examples, the image capture sequence includes at least three images captured such as image capture sequence 420A and 420B. In other examples, the image capture sequence includes only two images captured such as image capture sequence 420C.

In the image capture sequence 420A, a first image can include a background-illuminated image 422 that is captured while the background lights 144 are illuminated. A second image can include a subject-illuminated image 424 that is captured while the main light 152 is illuminated. A third image can include a fiducially marked image 426 that is captured while one or more fiducial light sources of the fiducial marking device 106 are illuminated (e.g., while the one or more collimated are being emitted). In image capture sequence 420A, no other exposures are present in the third image. For example, no other lights, such as the background lights 144 are being illuminated while the fiducial light sources are illuminated.

In the image capture sequence 420B, a first image can include the background-illuminated image 422 that is captured while the background lights 144 are illuminated. A second image can include the subject-illuminated image 424 that is captured while the main light 152 is illuminated. A third image can include a single image frame 428 that is effectively a combination of the background-illuminated image 422 and the fiducially marked image 426 captured in a single frame. For example, during the capture of the third image both the background lights 144 and the fiducial light sources are illuminated.

In the image capture sequence 420C, the first image can include the single image frame 428 captured while both the background lights 144 and the fiducial light sources are illuminated. The second image can include the subject-illuminated image 424 captured while the main light 152 is illuminated.

In each of the described image capture sequences, 420A, 420B, and 420C, the subject-illuminated image is captured while the main light 152 is illuminated independent from any other image and illumination. The controller 140 can operate to synchronize the illumination of the various light sources with the respective image captures.

Figure 12:
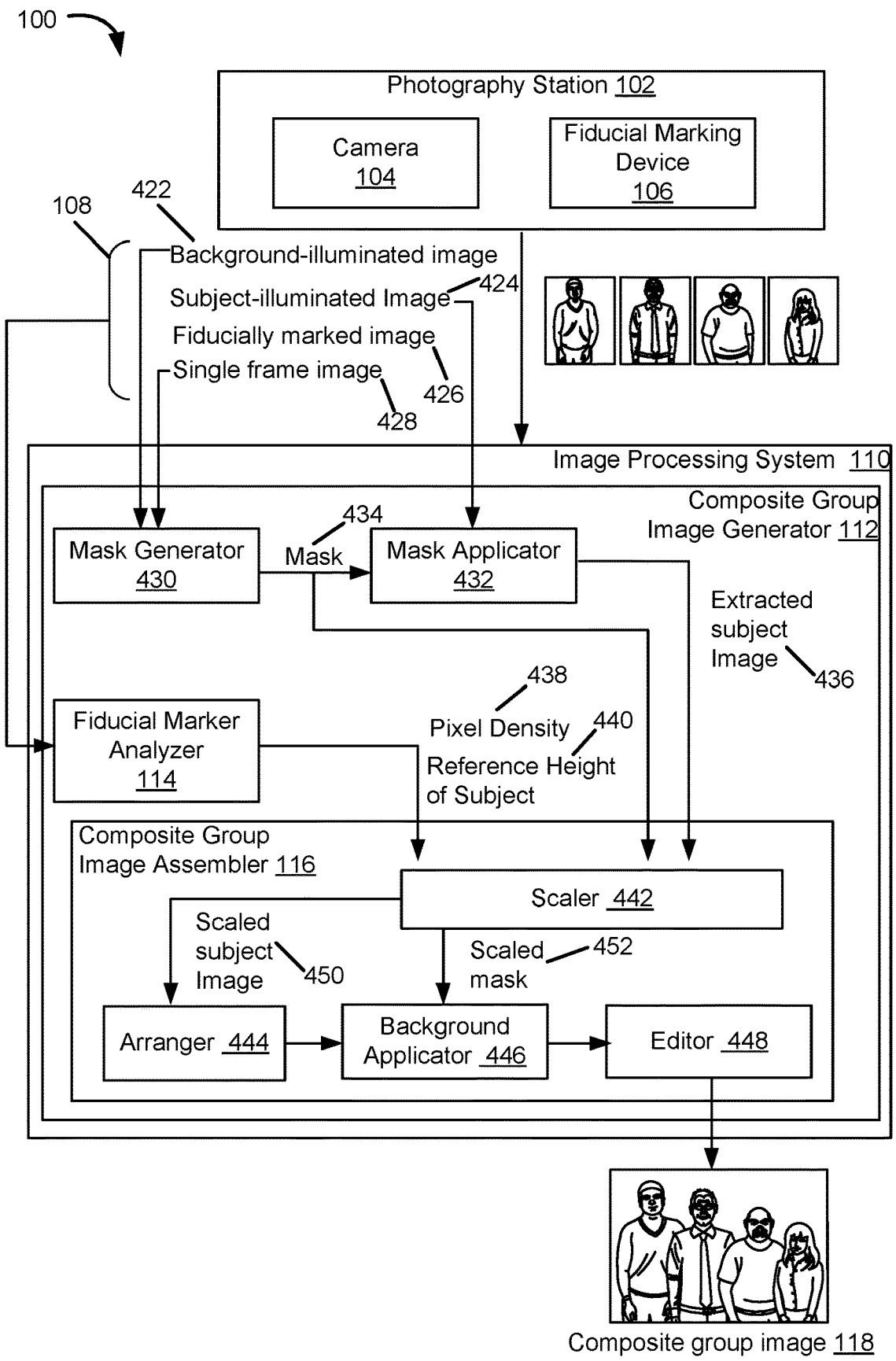
FIG. 12 is a system flow diagram for assembling a composite group image from images of individual subjects.

FIG. 12 is a system flow diagram for assembling the composite group image 118 from images of individual subjects 108. The system 100 includes the photography station 102 and the image processing system 110 as described in FIG. 1. The camera 104 of the photography station 102 can perform an image capture sequence, such as one of the image capture sequences 420A, 420B, and 420C described in FIG. 11. In one of the image captures, the fiducial marking device 106 of the photography station 102 is activated. For example, referencing the fiducial marking device 106 shown and described in FIG. 4, the first fiducial light source 180 and the second fiducial light source 182 are activated by the circuit 232 to emit the first collimated light 184 and the second collimated light 186 forming the first fiducial marker 188 and the second fiducial marker 190 on the subject S, which is captured in the fiducially marked image 426 or the single image frame 428. Other images captured by the camera 104 can include a background-illuminated image 422 and the subject-illuminated image 424. Similar images can be captured for each subject to be included within the composite group image 118.

Once captured by the camera 104, a set of images for each of the subjects of the group (e.g., collectively referred to as the images of individual subjects 108) can be transmitted from the camera 104 to the image processing system 110. In one example, a set of images can include the background-illuminated image 422, the subject-illuminated image 424, and the fiducially marked image 426. As another alternative, the set of images can include the background-illuminated image 422, the subject-illuminated image 424, and the single image frame 428. As a further alternative, the set of images can include the subject-illuminated image 424 and the single image frame 428.

In addition to the fiducial marker analyzer 114 and the composite group image assembler 116 described in FIG. 1, the composite group image generator 112 can further include a mask generator 430 and a mask applicator 432. The mask generator 430 can receive the background-illuminated image 422 and/or the single image frame 428 to generate a mask 434.

In some examples, the mask generator 430 can generate the mask 434 using a single image. In one example, the mask 434 can be generated using the background-illuminated image 422 if the image capture sequence 420A or 420B is performed. In another example, the mask 434 can be generated using the single image frame 428 if the image capture sequence 420C is performed. Additional details for generating the mask 434 based on a single image are described in U.S. Pat. No. 7,834,894, issued on Nov. 16, 2010, entitled METHOD AND APPARATUS FOR BACKGROUND REPLACEMENT IN STILL PHOTOGRAPHS, the entirety of which is hereby incorporated by reference.

In other examples, the mask generator 430 can generate a mask from multiple images. For example, if the image capture sequence 420B is performed where the background lights 144 are illuminated in both the first and third capture, the mask generator 430 can generate the mask 434 using both the background-illuminated image 422 and the single image frame 428. By generating the mask 434 using both the background-illuminated image 422 and the single image frame 428, any motion of the subject S between the first capture and the third capture can be determined and an intermediate position of the subject during the second capture (e.g., the capture of the subject-illuminated image 424) is estimated. The mask 434 can then be generated at the estimated intermediate position. In some examples, the subject-illuminated image 424 can also be utilized to facilitate generation of the mask 434. Additional details for generating the mask 434 based on multiple images are described in U.S. Pat. No. 10,110,792, issued on Oct. 23, 2018, entitled BACKGROUND REPLACEMENT SYSTEM AND METHODS, the entirety of which is hereby incorporated by reference.

After the mask 434 is generated, the mask applicator 432 can receive the mask 434 along with the subject-illuminated image 424. The mask applicator 432 can then overlay the mask 434 onto the subject-illuminated image 424. The mask 434 should have equal to, or close to, a 1-to-1 correspondence in position with the subject S in the subject-illuminated image 424. For example, the mask 434 has the same width and height dimensions in pixels as the subject-illuminated image 424. Thus, in one embodiment, one corner pixel of the mask 434 can be aligned with the corresponding corner pixel of the subject-illuminated image 424. Then any portion of the subject-illuminated image 424 that is not covered by the mask 434 (e.g., the background) can be removed such that only the subject S remains, hereinafter referred to as an extracted subject image 436. In some examples, a new subject image is created from the subject-illuminated image 424 and the mask 434 is overlaid onto the new subject image to generate the extracted subject image 436. The extracted subject image 436 and the mask 434 for each subject to be included in the composite group image 118 can be provided to the composite group image assembler 116.

Additionally, for each subject's set of images, the fiducial marker analyzer 114 can determine a pixel density 438 of the images and a reference height 440 of the subject based on a location of the first fiducial marker 188 and the second fiducial marker 190. As described in greater detail below with reference to FIG. 13, to determine the fiducial marker locations, a new image can be created, where a value for each pixel in the new image is set to a first value or a second value based on a set of conditions. The set of conditions are associated with values of the pixel in one or more images captured in the image capture sequence 420, including the background-illuminated image 422, the subject-illuminated image 424, the fiducially marked image 426 and/or the single image frame 428, for example. In some examples, a pixel being set to the first value can indicate the pixel is in a location where the first collimated light 184 or the second collimated light 186 formed the first fiducial marker 188 or the second fiducial marker 190 on the subject S. The pixel being set to the first value indicates the pixel is not in a location where the first collimated light 184 or the second collimated light 186 formed the first fiducial marker 188 or the second fiducial marker 190 on the subject S.

Once a value for each pixel is determined, pixels having the first value that are otherwise surrounded by pixels having the second value can be identified and the value of those pixels reset to the second value (e.g., to effectively remove these outlier pixels from the cluster identification). Clusters can then be identified from remaining pixels having the first value. For example, a first cluster of pixels identified can correspond to the first fiducial marker 188 and a second cluster of pixels identified can correspond to the second fiducial marker 190. A first horizontal pixel location and a first vertical pixel location at a center of the first cluster can be determined as the location of the first fiducial marker 188. A second horizontal pixel location and a second vertical pixel location at a center of the second cluster can be determined as the location of the second fiducial marker 190.

Based on the location of the first fiducial marker 188 and the location of the second fiducial marker 190, the pixel density 438 and the reference height 440 of the subject can be determined. In some examples, the determination is further based on the first horizontal pixel location relative to the second horizontal pixel location. For example, when the first horizontal pixel location is less than or equal to the second horizontal pixel location, the reference height 440 of the subject can be determined based on the first vertical pixel location, the first horizontal pixel location, the second horizontal pixel location, and the tilt angle 199 of the camera 104. Alternatively, when the first horizontal pixel location is greater than the second horizontal pixel location, the reference height 440 of the subject is determined to be the first vertical pixel location. The determination of the pixel density 438 is based on the first and second horizontal pixel locations, the first and second vertical pixel locations, a coefficient dependent on the first horizontal pixel location relative to the second horizontal pixel location and the vertical distance 198 between the first collimated light 184 and the second collimated light 186. Once determined, the pixel density 438 and the reference height 440 of the subject can then be transmitted to the composite group image assembler 116.

The composite group image assembler 116 can include one or more of a scaler 442, an arranger 444, a background applicator 446, and an editor 448. For each subject to be included in the composite group image 118, the composite group image assembler 116 can receive and use the mask 434, the extracted subject image 436, the pixel density 438, and the reference height 440 of the subject to generate a photography product of the subject (e.g., by processing at least the extracted subject image 436 and optionally the mask 434 based on the pixel density 438 and the reference height 440 of the subject) for inclusion in the composite group image 118.

As part of the processing, the scaler 442 can process the extracted subject image 436 based on several factors to create a scaled subject image 450. For example, the scaler 442 can process the extracted subject image 436 based on the determined pixel density 438 and the reference height 440 of the subject relative to determined pixel densities of images captured of the other subjects and reference heights of the other subjects to be included in the composite group image 118. This processing enables subjects to be more accurately represented relative to their heights and sizes in the composite group image 118. In addition to resizing and/or scaling the extracted subject image 436, the processing can include panning the extracted subject image 436 or adjusting the extracted subject image 436 vertically based on the subject height so that the subject appears to be a proper height within the composite group image 118.

Additionally, the scaler 442 can process the extracted subject image 436 based on a position of the subject relative to positions of the other subjects in the composite group image 118. As one example, the composite group image 118 can include multiple rows of subjects, such as the composite group image 118 shown in FIG. 14. Taller subjects are often arranged (e.g., by the arranger 444) in a row toward the back, while shorter subjects are arranged in a row toward the front. Scaling factors for the extracted subject image can then vary based on a row in which the subject is to be arranged in order to achieve a more natural look. For example, subjects in a front row may be scaled slightly larger than subjects in a back row to simulate the effects of being closer to a lens of a camera.

In some examples, the scaler 442 can also receive the mask 434, where the mask 434 is scaled substantially the same as the extracted subject image 436. For example, a scaled mask 452 can have an equal to, or close to, a 1-to-1 correspondence in position with the subject S in the scaled subject image 450. This can allow for greater accuracy in background insertion and/or replacement once the subject is arranged within the composite group image 118.

The scaled subject image 450 of the subject S (e.g., the photography product of the subject S) can then be arranged relative to scaled subject images of the other subjects to be included in the composite group image 118 by the arranger 444. If a background is to be inserted, the background applicator 446 can apply the scaled mask 452 to the scaled subject image 450 for each subject, and insert the background. The scaled mask 452 can then be removed leaving the scaled subject image 450 integrated with background in a natural looking manner (e.g., as if the subjects were standing in front of the background when the image was captured). In some examples, the editor 448 can perform further edits to the composite group image 118. As one example, the composite group image 118 can be cropped such that no subjects appear cut off. In further examples, vignettes and shadowing can be applied to the composite group image 118 such that no subject appear cut off. Other transformations can also performed by the editor 448. Examples of transformations include a color correction, a dust correction, a brightness correction, a tilt, or other desired transformations or combinations of transformations. Additional details regarding arrangement, background insertion, and editing are disclosed in U.S. Pat. No. 9,025,906 B2 issued on May 5, 2015 and U.S. patent application Ser. No. 13/804,880 filed on Mar. 24, 2013, the entireties of which are hereby incorporated by reference. The composite group image 118 is then provided as output of the image processing system 110.

In some examples, the composite group image 118 can be provided to a production system to produce one or more products. Examples of products include marketing or promotional material, a photo mug, a picture book, a photograph, a computer-readable medium storing digital image data, and digital images delivered across a network. Other examples of products include a composite product (composed of multiple different images), a photo mouse pad, a collage, a key tag, a digital picture frame or digital key chain, a photo card (such as a student identification card, driver's license, holiday or greeting card, security badge, baseball or other sports card, luggage tag, etc.), a photo magnet, an ornament, a puzzle, a calendar, a tote bag, a photo keepsake box, a t-shirt, an apron, or a variety of other products including a photographic image. In some examples, the production system can include a web server that is configured to communicate data across a network, such as to send products in the form of digital data to a client computing system.

Figure 13:
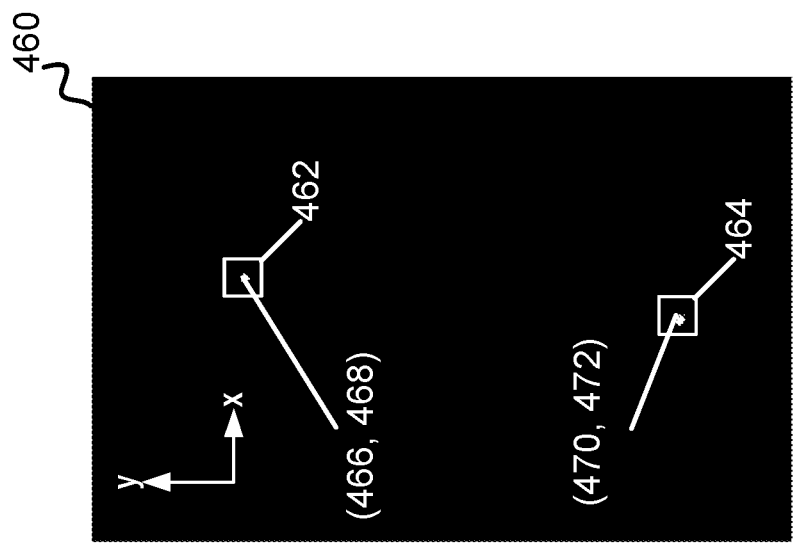
FIG. 13 conceptually illustrates a digital image including fiducial markers and analysis thereof.
Figure 13:
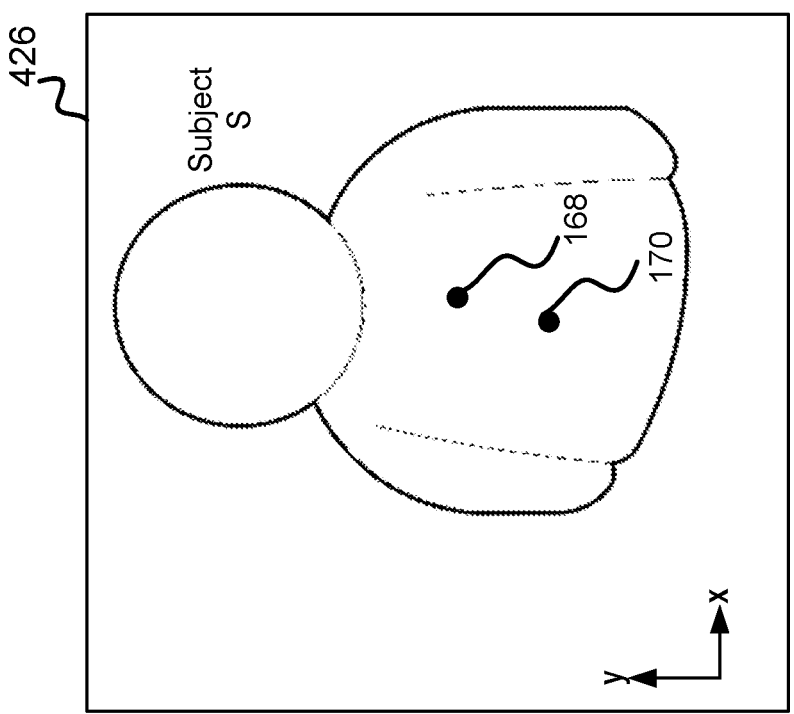

FIG. 13 conceptually illustrates the fiducially marked image 426 and analysis thereof. For example, when the image capture sequence 420A is performed, the fiducially marked image 426 is captured by the camera 104 while the first fiducial light source 180 and the second fiducial light source 182 of the fiducial marking device 106 shown and described with reference to FIG. 4 are emitting the first collimated light 184 and the second collimated light 186. The fiducially marked image 426 includes the first fiducial marker 188 and the second fiducial marker 190 formed on the subject S by the first collimated light 184 and the second collimated light 186, respectively. The camera 104 can transmit image data, including the fiducially marked image 426, to the image processing system 110. The fiducial marker analyzer 114 of the composite group image generator 112 can then analyze the fiducially marked image 426 to determine a location of the first fiducial marker 188 and the second fiducial marker 190. Based on the location of the first fiducial marker 188 and the second fiducial marker 190, the fiducial marker analyzer 114 can further determine the pixel density 438 and the reference height 440 (e.g., in pixels) of the subject S.

Determining a location of the first fiducial marker 188 and the second fiducial marker 190 includes determination of a horizontal pixel location and a vertical pixel location of the first fiducial marker 188 and of the second fiducial marker 190. To determine the locations, a new image 460 is generated utilizing each image captured in the image capture sequence 420A to identify pixels where the first collimated light 184 and the second collimated light 186 illuminated the subject S. The pixels can be identified based on a set of conditions that are associated with pixel values in each image in the image capture sequence 420A, including the background-illuminated image 422, the subject-illuminated image 424, and the fiducially marked image 426.

As one example, a gray representation of the background-illuminated image 422 (Gray 1), a gray representation of the subject-illuminated image 424 (Gray 2), and a gray representation of the fiducially marked image 426 (Gray 3) are computed. Gray 1, Gray 2, and Gray 3 are computed by obtaining a mean of the red, green, and blue pixel values of the pixel in the respective image. For example, to compute Gray 1, the red pixel value, the green pixel value and the blue pixel value of the pixel in the background-illuminated image 422 are summed and then divided by three. Similar computations are performed for Gray 2 and Gray 3. Also, a difference in the red pixel value of the pixel in the background-illuminated image 422 (Red 1) and the red pixel value of the pixel in the fiducially marked image 426 (Red 3) is computed. Further, a red chromaticity value (r3) and a green chromaticity value (g3) of the pixel in the fiducially marked image 426 is computed. The pixel can be identified as a pixel where the first collimated light 184 and the second collimated light 186 illuminated the subject S when each of the following conditions based on the above-discussed pixel associated values are satisfied: Gray1<Gray2, Gray3<Gray2, Red3−Red1>40, r3>0.50, and g3<0.30.

If the set of conditions are met, then an intensity of the pixel can be set to a first value in the new image 460 to indicate the pixel is a pixel where the first collimated light 184 and the second collimated light 186 illuminated the subject S. For example, the first value can be a value of 255 such that the pixel appears white in the new image 460. If the set of conditions are not met, then the intensity of the pixel can be set to a second value in the new image 460 to indicate the pixel is not a pixel where the first collimated light 184 and the second collimated light 186 illuminated the subject S. For example, the second value can be a value of 0 such that the pixel appears black in the new image 460.

Once each pixel in the new image 460 has been analyzed and set to the first value (e.g., 255) or the second value (e.g., 0), one or more pixels having the first value that are surrounded by pixels having the second value can be reset from the first value to the second value to effectively remove the surrounded pixels from a subsequent cluster determination. The pixels removed are outliers, for example.

One or more clusters can be identified from the remaining pixels having the first values. As illustrated, two clusters are identified: a first cluster 462 corresponding to the first fiducial marker 188 and a second cluster corresponding to the second fiducial marker 190. A first horizontal pixel location 466 (HPL1) and a first vertical pixel location 468 (VPL1) at a center of the first cluster 462 is identified as the location of the first fiducial marker 188. Additionally, a second horizontal pixel location 470 (HPL2) and a second vertical pixel location 472 (VPL2) at a center of the second cluster 464 is identified as the location of the second fiducial marker 190.

In some examples, to identify the first cluster 462 and the second cluster 464, the fiducial marker analyzer 114 can search the new image 460 top to bottom from left to right until a pixel having the first value (e.g., a pixel value of 255) is located. Once located, a 100×100 block of pixel (e.g., a block large enough to encompass a cluster) is analyzed to identify the pixel at the center of the cluster and the respective horizontal and vertical location of that pixel. In some examples, the pixel at the center is identified by averaging average horizontal and vertical location of the pixels in the cluster. Once identified, the fiducial marker analyzer 114 can continue to search the new image 460 to identify the next cluster.

Based on the determined locations of the first fiducial marker 188 and the second fiducial marker 190, the pixel density 438 and a reference height 440 of the subject can be determined. As previously discussed, because most subjects are three-dimensional, a compensation for how the first collimated light 184 and the second collimated light 186 reflects off of the subject is needed to account for the three-dimensional effect when determining the pixel density 338 and the reference height 440. The compensation can be dependent on the tilt angle 199 of the camera 104. As one example, the tilt angle 199 can be a 12 degree tilt-down of the camera 104. Additionally, the compensation can be further dependent on the first horizontal pixel location 466 (HPL1) relative to the second horizontal pixel location 470 (HPL2). For example, the compensation computation can differ when the first horizontal pixel location 466 (HPL1) is lesser than or equal to the second horizontal pixel location 470 (HPL2) versus when the first horizontal pixel location 466 (HPL1) is greater than the second horizontal pixel location 470 (HPL2).

As one example, when the first horizontal pixel location 466 (HPL1) is lesser than or equal to the second horizontal pixel location 470 (HPL2), the pixel density 338 and the reference height 440 of the subject are computed as follows:

$$\text{Pixel density}=\text{vertical distance } 198/(\text{VPL2}-\text{VPL1}+x^*(\text{HPL2}-\text{HPL1})), \quad (1)$$

and $$\text{Reference height of the subject}=\text{VPL1}-y^*(\text{HPL2}-\text{HPL1}), \quad (2)$$

where x is 0.550 and y is 0.55 when the tilt angle 199 is a 12 degree tilt-down.

As another example, when the first horizontal pixel location 466 (HPL1) is greater than the second horizontal pixel location 470 (HPL2), the pixel density 338 and the reference height 440 of the subject are computed as follows:

$$\text{Pixel density}=\text{vertical distance } 198/(\text{VPL2}-\text{VPL1}-x^*(\text{HPL2}-\text{HPL1})), \quad (1)$$

and $$\text{Reference height of the subject}=\text{VPL1}, \quad (2)$$

where x is 0.725 when the tilt angle 199 is a 12 degree tilt-down.

Although FIG. 13 describes determination of the pixel density 338 and the reference height 440 of the subject specific to when the image capture sequence 420A is performed, similar methods to determine the pixel density 338 and the reference height 440 of the subject are performed when alternative image capture sequences 420B or C or performed. In such image capture sequences, the single image frame 428 that includes the fiducial markers is analyzed, along with one or both of the subject-illuminated image 424 and the background-illuminated image 422.

Figure 14:
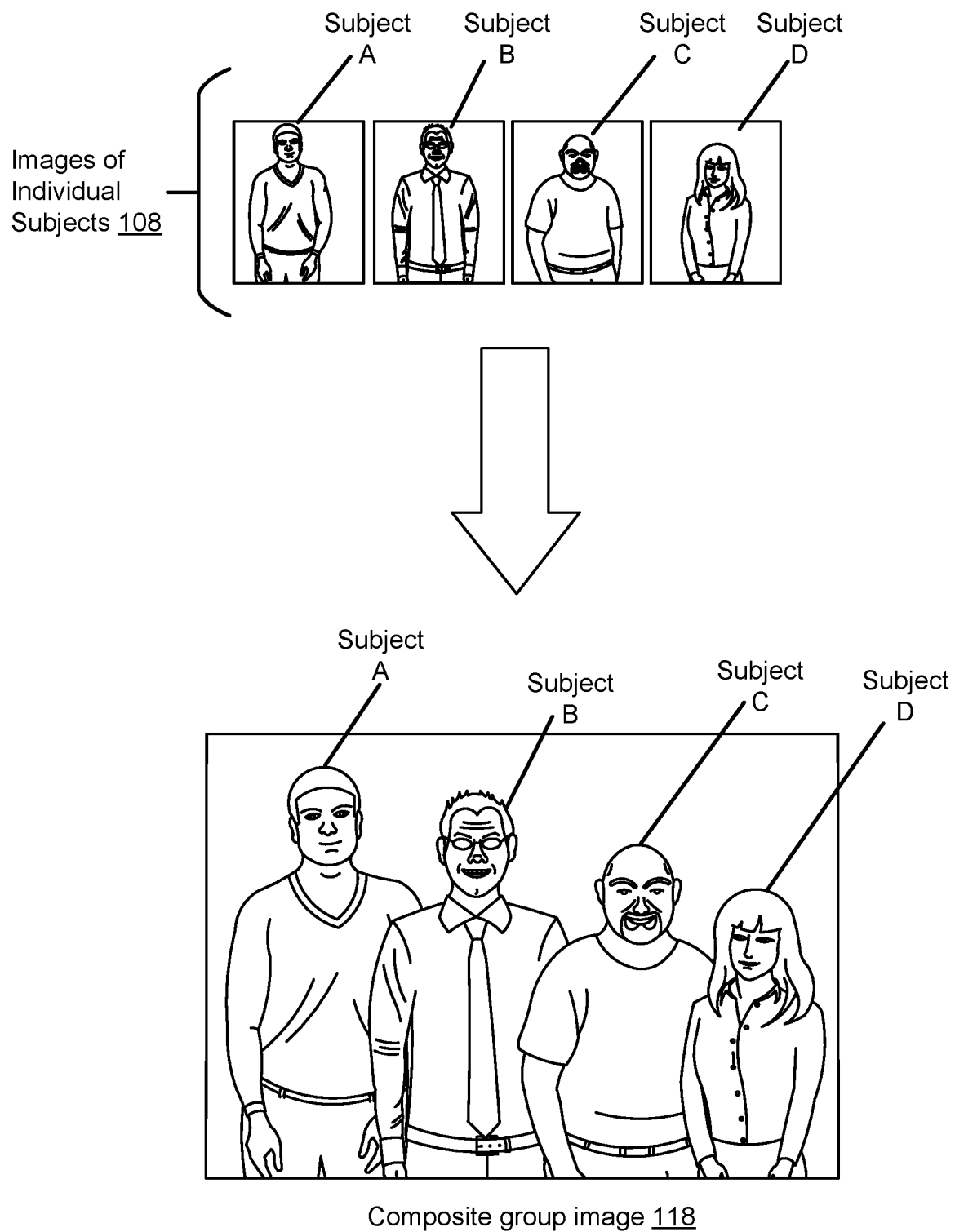
FIG. 14 is an example of a composite group image generated from images of individual subjects.

FIG. 14 is an example of the composite group image 118 generated from images of individual subjects 108. In this example, a set of images for each of four subjects (e.g., Subjects A, B, C, and D) to be included in the composite group image 118 are captured by the camera 104. Each set of images can include one or more of a background-illuminated image 422, a subject-illuminated image 424, a fiducially marked image 426 and a single image frame 428. A mask 434 is generated using one or both of the background-illuminated image 422 and the single image frame 428. The mask 434 can be applied to the subject-illuminated image 424 to generate an extracted subject image 436. Additionally, the fiducially marked image 426 or the single image frame 428 can include fiducial markers, and collectively the images within the set can be analyzed to determine locations of the fiducial markers, where the locations are used to further determine a pixel density 438 and a reference height 440 of the subject in the set of images.

The extracted subject image 436 for each subject can be scaled based on the determined pixel density 438 and the reference height 440 relative to determined pixel densities and reference heights of subjects from the other sets of images. For example, Subject D is shorter than Subject C, who is shorter than Subject B, who is shorter than Subject A. If the pixel density 438 and the reference height 440 were not determined and used to scale the extracted subject image 436, then each of the subject extracted images would be automatically resized such that all the subjects were of the same height. As one example, Subject A and Subject B would be resized to appear shorter than they are, whereas Subject C and Subject D would be resized to appear taller than they are. However, by scaling the extracted subject image 436 based on the determined pixel density 438 and the reference height 440, this issue is avoided and each subject can be represented accurately with respect to the other subjects as illustrated by the composite group image.

Additionally, the extracted subject image 436 can be scaled based on a position of the extracted subject image 436 within the composite group image 118. For example, taller subjects, such as Subject A can be positioned further back than shorter subjects such as Subject D. Subjects that are positioned forward such as Subject D can be scaled slightly larger than subjects positioned further back to simulate the effects of being closer to a lens of a camera.

Figure 15:
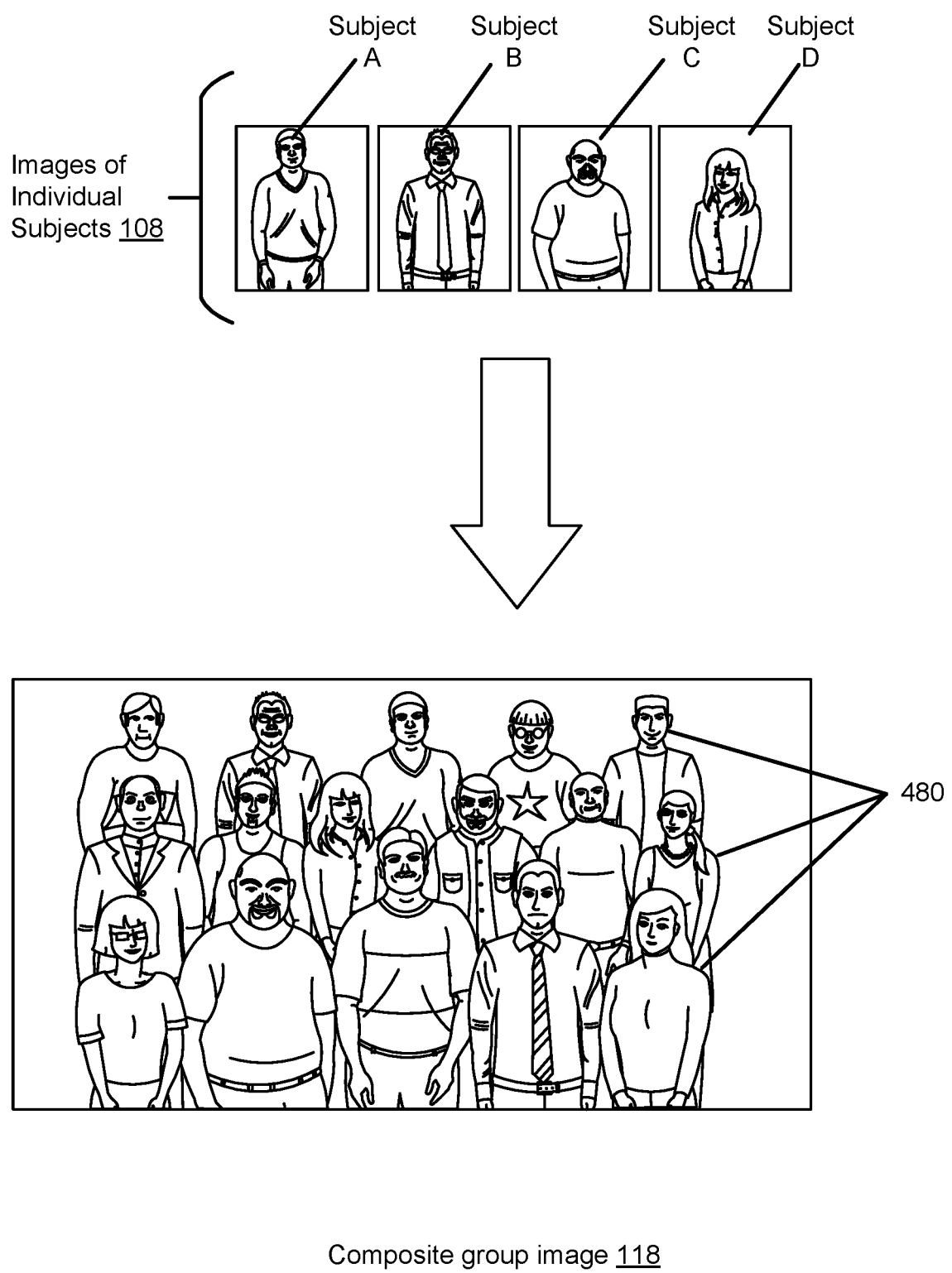
FIG. 15 is another example of a composite group image generated from images of individual subjects.

FIG. 15 is another example of the composite group image 118 generated from images of individual subjects 108. For each subject, the extracted subject image 436 is generated and the pixel density 438 and the reference height 440 are determined in a similar manner as described in FIG. 13. The extracted subject image 436 for each subject is then scaled based on the determined pixel density 438 and the reference height 440 relative to determined pixel densities and reference heights of subjects from the other sets of images as described in FIG. 13. Additionally, the extracted subject image 436 can be scaled based on a position of the extracted subject image 436 within the composite group image 118. For example, as illustrated, the composite group image 118 can include multiple rows 480 of subjects. Taller subjects such as Subject A and Subject B are often arranged in a row toward the back, while shorter subjects such as Subject C and Subject D are arranged in a row toward the front. Scaling factors for the extracted subject image 436 can then be based on a row in which the subject is to be arranged in order to achieve a more natural look. For example, subjects in a front row may be scaled slightly larger than subjects in a back row to simulate the effects of being closer to a lens of a camera.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A computer-implemented method comprising:
receiving a fiducially marked image of a subject that is captured by a camera while the subject is illuminated with at least a first collimated light and a second collimated light parallel to the first collimated light, the fiducially marked image including a first fiducial marker formed on the subject by the first collimated light and a second fiducial marker formed on the subject by the second collimated light;
determining a first location of the first fiducial marker;
determining a second location of the second fiducial marker;
determining a pixel density of the fiducially marked image and a reference height of the subject based on the first location, the second location, and a compensation for a three-dimensional shape of the subject;
receiving at least one other image of the subject captured by the camera; and
generating a photography product using the at least one other image, the pixel density of the fiducially marked image, and the reference height of the subject.

2. The method of claim 1, wherein determining the first location of the first fiducial marker and the second location of the second fiducial marker further comprises:
creating a new image;
for each pixel of a plurality of pixels in the new image, setting a value of the pixel to a first value or a second value based on a set of conditions associated with values of the pixel in a set of images that include the fiducially marked image;
resetting the value of one or more pixels having the first value that are surrounded by pixels having the second value to the second value;
identifying clusters from remaining pixels having the first value, a first cluster of pixels corresponding to the first fiducial marker and a second cluster of pixels corresponding to the second fiducial marker; and
determining a first horizontal pixel location and a first vertical pixel location at a center of the first cluster as the first location of the first fiducial marker and a second horizontal pixel location and a second vertical pixel location at a center of the second cluster as the second location of the second fiducial marker.

3. The method of claim 1, wherein the compensation for the three-dimensional shape of the subject accounts for a location shift of at least one of the first fiducial marker and the second fiducial marker included in the fiducially marked image due to the three-dimensional shape of the subject.

4. The method of claim 1, wherein:
the first location of the first fiducial marker comprises a first horizontal pixel location and a first vertical pixel location,
the second location of the second fiducial marker comprises a second horizontal pixel location and a second vertical pixel location, and
the compensation is based on at least one of:
a relative horizontal pixel location of the first fiducial marker and the second fiducial marker, and
a tilt angle of the camera.

5. The method of claim 4, further comprising:
determining the pixel density of the fiducially marked image based on a coefficient dependent on the first horizontal pixel location relative to the second horizontal pixel location and a vertical distance between the first collimated light and the second collimated light emitted to illuminate the subject.

6. The method of claim 4, further comprising:
when the first horizontal pixel location is less than or equal to the second horizontal pixel location, determining the reference height of the subject based on the first vertical pixel location, the first horizontal pixel location, the second horizontal pixel location, and the tilt angle of the camera.

7. The method of claim 4, further comprising:
when the first horizontal pixel location is greater than the second horizontal pixel location, determining the reference height of the subject as the first vertical pixel location.

8. A system comprising:
at least one processor; and
a memory coupled to the at least one processor and storing instructions that, when executed by the at least one processor, cause the at least one processor to:
receive a fiducially marked image of a subject that is captured by a camera while the subject is illuminated with a first collimated light and a second collimated light parallel to the first collimated light, the fiducially marked image including a first fiducial marker formed on the subject by the first collimated light and a second fiducial marker formed on the subject by the second collimated light;
determine a first location of the first fiducial marker;
determine a second location of the second fiducial marker;
determine a pixel density of the fiducially marked image and a reference height of the subject based on the first location, the second location, and a compensation for a three-dimensional shape of the subject;
receive at least one other image of the subject captured by the camera; and
generate a photography product using the at least one other image, the pixel density of the fiducially marked image, and the reference height of the subject.

* * * * *